(12) United States Patent
Kojima et al.

(10) Patent No.: US 7,803,434 B2
(45) Date of Patent: Sep. 28, 2010

(54) LIQUID-CRYSTALLINE MEDIUM

(75) Inventors: Akihiro Kojima, Atsugi (JP); Fumio Shimano, Miura (JP); Makoto Murakami, Atsugi (JP); Jeong Hee Sung, Yamato (JP)

(73) Assignee: Merck Patent GMBH, Darmstadt (DE)

( * ) Notice: Subject to any disclaimer, the term of this patent is extended or adjusted under 35 U.S.C. 154(b) by 0 days.

(21) Appl. No.: 11/960,023

(22) Filed: Dec. 19, 2007

(65) Prior Publication Data

US 2008/0191166 A1    Aug. 14, 2008

(30) Foreign Application Priority Data

Dec. 19, 2006   (EP)   ................... 06026256

(51) Int. Cl.
- *C09K 19/12* (2006.01)
- *C09K 19/30* (2006.01)
- *C09K 19/18* (2006.01)
- *C09K 19/44* (2006.01)
- *G02F 1/13* (2006.01)

(52) U.S. Cl. ............... 428/1.1; 252/299.63; 252/299.66

(58) Field of Classification Search .................. 428/1.1; 252/299.63, 299.66
See application file for complete search history.

(56) References Cited

U.S. PATENT DOCUMENTS

| 6,066,268 | A  | * | 5/2000  | Ichinose et al. | ........ | 252/299.63 |
| 6,440,506 | B1 | * | 8/2002  | Kojima et al.   | ................ | 428/1.1 |
| 7,288,295 | B2 | * | 10/2007 | Ichinose et al. | .............. | 428/1.1 |

FOREIGN PATENT DOCUMENTS

| EP | 1731493  | A1 | * | 12/2006 |
| JP | 2005-213320 |  | * | 8/2005 |

OTHER PUBLICATIONS

English translation by computer for JP 2005-213320, http://www4.ipdl.inpit.go.jp/Tokujitu/PAJdetail.ipdl?N0000=60&N0120=01&N2001=2&N3001=2005-213320.*

* cited by examiner

*Primary Examiner*—Shean C Wu
(74) *Attorney, Agent, or Firm*—Millen, White, Zelano, Branigan, P.C.

(57) ABSTRACT

Disclosed is a liquid-crystalline medium based on a mixture of polar compounds having negative dielectric anisotropy, which contains at least one compound of formula I

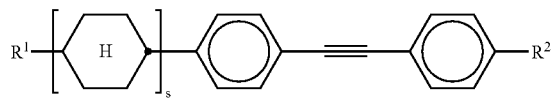

and at least one compound of formula I*,

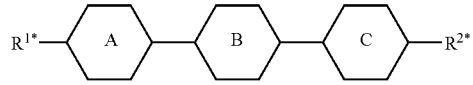

and their use in an electro-optical display.

15 Claims, No Drawings

LIQUID-CRYSTALLINE MEDIUM

The invention relates to a liquid-crystalline medium based on a mixture of polar compounds having negative dielectric anisotropy, which contains at least one compound of formula I

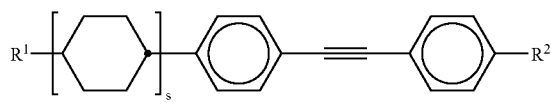

and at least one compound of formula I*,

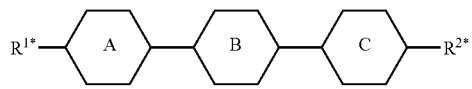

wherein
$R^1$, $R^2$, $R^{1*}$
and $R^{2*}$ are each independently alkyl or alkoxy with 1 to 8 C atoms, where one or more $CH_2$-groups in these radicals can be replaced by —CH=CH—,

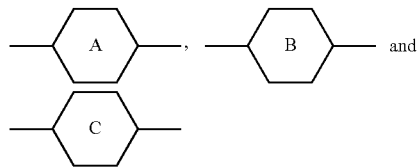

are each independently

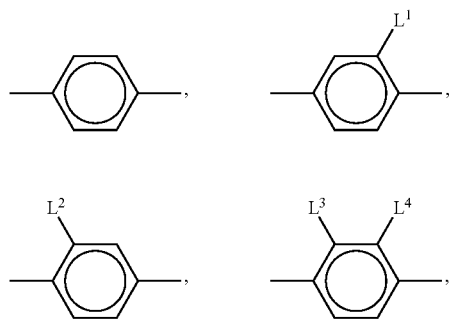

but at least one of the rings A, B and C is

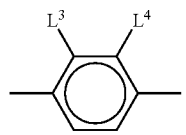

$L^{1-4}$ are each independently Cl, F, $CF_3$ or $CHF_2$, preferably $L^{1-4}$ are each independently F, and
s is 0 or 1, in particular for electro-optical displays having passive matrix addressing based on the ECB effect.

The principle of electrically controlled birefringence, the ECB effect, or the DAP effect (deformation of aligned phases) was described for the first time in 1971 (M. F. Schieckel and K. Fahrenschon, "Deformation of nematic liquid crystals with vertical orientation in electrical fields", Appl. Phys. Lett. 19 (1971), 3912). This was followed by papers by J. F. Kahn (Appl. Phys. Lett. (1972), 1193) and G. Labrunie and J. Robert (J. Appl. Phys. 44 (1973), 4869).

Papers by J. Robert and F. Clerc (SID 80 Digest Techn. Papers (1980), 30), J. Duchene (Displays 7 (1986), 3) and H. Schad (SID 82 Digest Techn. Papers (1982), 244) have shown that liquid-crystalline phases must have high values for the ratio between the elastic constants $K_3/K_1$, high values for the optical anisotropy Δn and values for the dielectric anisotropy Δ∈ of −0.5 to −5 in order to be usable for high-information display elements based on the ECB effect. Electro-optical display elements based on the ECB effect have homeotropic edge alignment.

The industrial application of this effect in electro-optical display elements requires LC phases which must satisfy a multiplicity of requirements. Particularly important here are chemical resistance to moisture, air and physical effects such as heat, radiation in the infra-red, visible and ultraviolet regions and direct and alternating electrical fields. Furthermore, LC phases which can be used industrially need a liquid-crystalline mesophase in a suitable temperature range and low viscosity.

None of the series of compounds having a liquid-crystalline mesophase which have been disclosed hitherto includes a single compound which meets all these requirements. Generally, therefore, mixtures of from two to 25, preferably from three to 18, compounds are prepared to give substances which can be used as LC phases. However, ideal phases cannot easily be produced in this way, since liquid-crystal materials having substantially negative dielectric anisotropy and adequate long-term stability were hitherto not available.

Matrix liquid-crystal displays (MLC displays) are known. Examples of nonlinear elements which can be used to individually switch the individual pixels are active elements (i.e. transistors). This is then referred to as an "active matrix", and a differentiation can be made between two types:
1. MOS (metal oxide semiconductor) transistors on silicon wafers as substrate,
2. Thin-film transistors (TFT) on a glass plate as substrate.

In the case of type 1, the electro-optical effect used is usually dynamic scattering or the guest-host effect. The use of monocrystalline silicon as substrate material restricts the display size, since even the modular assembly of various part-displays results in problems at the joins.

In the case of the more promising type 2, which is preferred, the electro-optical effect used is usually the TN effect. A distinction is made between two technologies: TFTs comprising compound semi-conductors, such as, for example, CdSe, or TFTs based on polycrystalline or amorphous silicon. Intensive research efforts are being made worldwide in the latter technology.

The TFT matrix is applied to the inside of one glass plate of the display, while the inside of the other glass plate carries the transparent counter-electrode. Compared with the size of the pixel electrode, the TFT is very small and has virtually no adverse effect on the image. This technology can also be extended to fully colour-compatible image displays, in which a mosaic of red, green and blue filters is arranged in such a manner that each filter element is located opposite a switchable pixel.

The TFT displays disclosed hitherto usually operate as TN cells with crossed polarizers in transmitted light and are illuminated from the back.

The term MLC display here covers any matrix display containing integrated nonlinear elements, i.e. in addition to the active matrix, also displays containing passive elements such as varistors or diodes (MIM=metal-insulator-metal).

MLC displays of this type are particularly suitable for TV applications (for example pocket TV sets) or for high-information displays in automobile or aircraft construction. In addition to problems with respect to the angle dependence of the contrast and the response times, difficulties occur in MLC displays due to inadequate resistivity of the liquid-crystal mixtures [TOGASHI, S., SEKIGUCHI, K., TANABE, H, YAMAMOTO, E., SORI-MACHI, K., TAJIMA, E., WATANABE, H., SHIMIZU, H., Proc. Eurodisplay 84, September 1984: A 210-288 Matrix LCD Controlled by Double Stage Diode Rings, p. 141 ff, Paris; STROMER, M., Proc. Eurodisplay 84, September 1984: Design of Thin Film Transistors for Matrix Addressing of Television Liquid Crystal Displays, p. 145 ff, Paris]. As the resistance decreases, the contrast of an MLC display worsens. Since the resistivity of the liquid-crystal mixture generally decreases over the life of an MLC display due to interaction with the internal surfaces of the display, a high (initial) resistance is very important for displays which must have acceptable resistance values over a long operating period.

The disadvantage of the MLC-TN displays disclosed hitherto is due to their comparatively low contrast, the relatively high viewing angle dependence and the difficulty of producing grey shades in these displays.

EP 0 474 062 discloses MLC displays based on the ECB effect. The LC mixtures described therein are based on 2,3-difluorophenyl derivatives containing an ester, ether or ethyl bridge and have low values for the "voltage holding ratio" (HR) after exposure to UV and therefore cannot be used for displays of the projection type.

Thus, there continues to be a great demand for MLC displays having very high resistivity at the same time as a wide operating temperature range, short response times and low threshold voltage, with the aid of which various grey shades can be produced.

The invention has the object of providing MLC displays, in particular projection displays, based on the ECB effect which do not have the abovementioned disadvantages, or do so only to a reduced extent, and at the same time have very high resistivities and very low temperature stability.

It has now been found that this object can be achieved if nematic liquid-crystal mixtures containing at least one compound of the formula I and at least one compound of the formula I* are used in these display elements.

The invention thus relates to a liquid-crystalline medium based on a mixture of polar compounds having negative dielectric anisotropy, which contains at least one compound of formula I

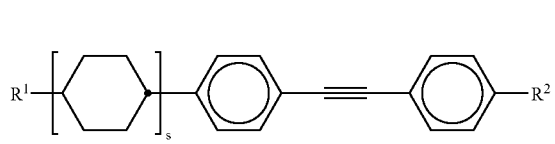

and at least one compound of formula I*,

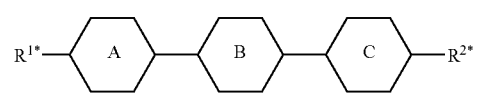

wherein
$R^1, R^2, R^{1*}$ and $R^{2*}$ are each independently alkyl or alkoxy with 1 to 8 C atoms, where one or more $CH_2$-groups in these radicals can be replaced by —CH=CH—,

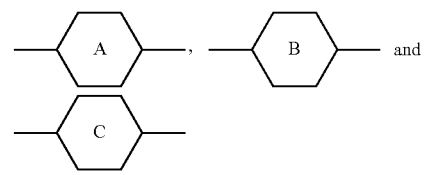

are each independently

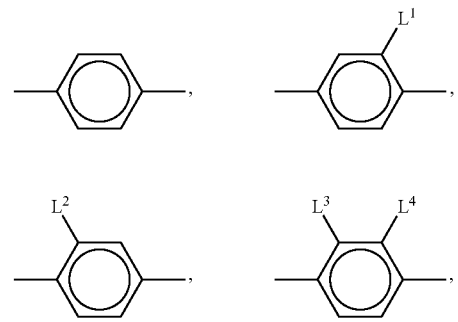

but at least one of the rings A, B and C is

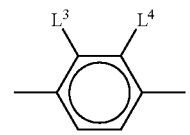

$L^{1-4}$ are each independently Cl, F, $CF_3$ or $CHF_2$, preferably $L^{1-4}$ are each independently F, and s is 0 or 1.

Preferred embodiments are:
a) A medium which contains one or more compounds selected from the formulae Ia to Ih:

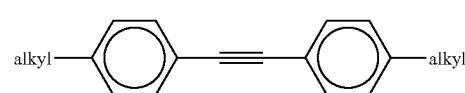

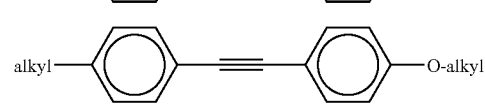

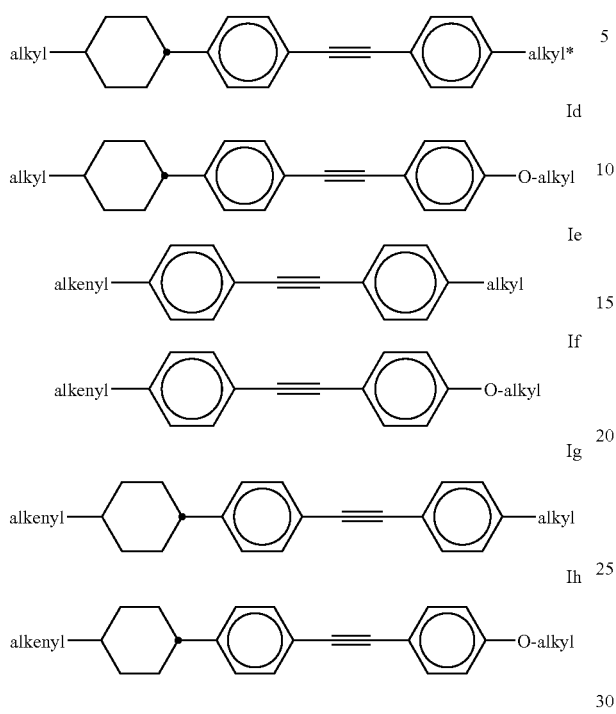

in particular containing at least one compound of formula Ib and/or Id.

Alkyl, alkyl* and alkoxy (=O-alkyl) are in each case a straight chained residue containing 1 to 6 carbon atoms. The term "alkenyl" in formulae I and I* comprise straight chain and branched alkenyl groups with 2 to 7 C atoms. Straight chain alkenyl groups are preferred. Further preferred alkenyl groups are $C_2$-$C_7$-1E-alkenyl, $C_4$-$C_7$-3E-alkenyl, $C_5$-$C_7$-4-alkenyl, $C_6$-$C_7$-5-alkenyl and $C_7$-6-alkenyl, in particular $C_2$-$C_7$-1E-alkenyl, $C_4$-$C_7$-3E-alkenyl and $C_5$-$C_7$-4-alkenyl. Of these, especially preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl and 6-heptenyl. Alkenyl groups with up to 5 C atoms are particularly preferred.

b) A medium which contains one or more compounds selected from the formulae I*a to I*l,

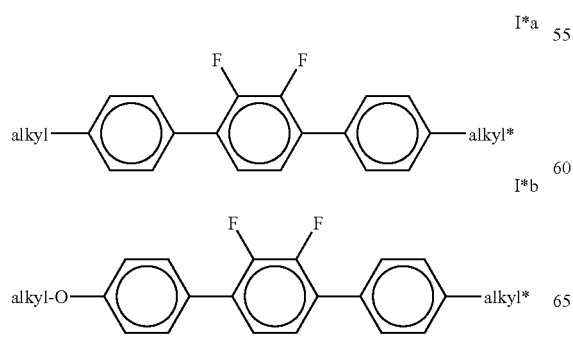

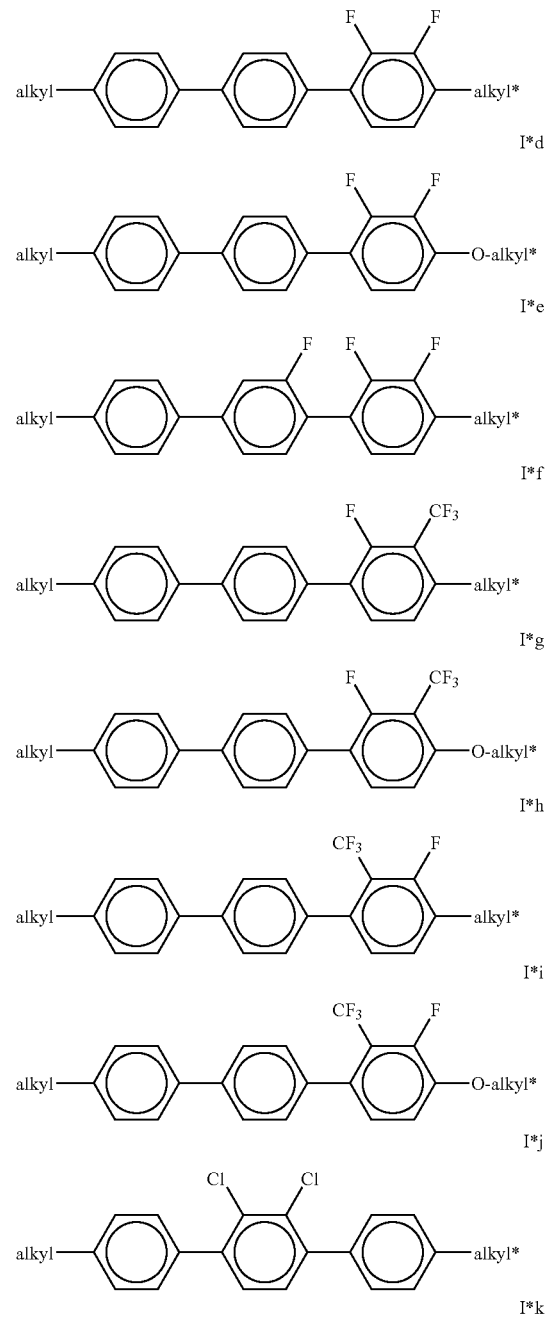

wherein alkyl and alkyl* have the meanings given above.

Preferably in formula I* $L^1$, $L^2$, $L^3$ and $L^4$ are each F. In a preferred embodiment ring A and/or ring B is

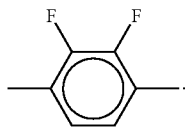

c) A medium containing at least one compound of the formula II,

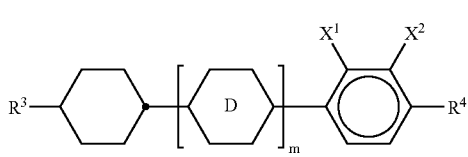

wherein
$R^3$ and $R^4$ have the meanings given for $R^1$ and $R^2$
Ring D is

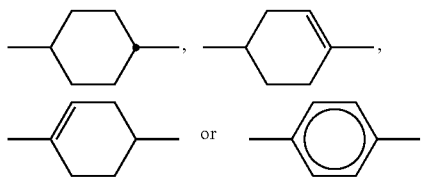

m is 0 or 1
$X^1$ and $X^2$ are each independently F, Cl, $OCF_3$, $OCHF_2$, $CF_3$.
In formula II, ring D, i.e.,

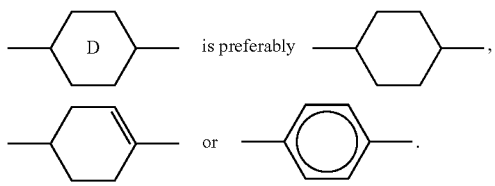

$X^1$ and $X^2$ are preferably F, $R^3$ is preferably alkyl or alkenyl. $R^4$ is preferably alkyl or alkoxy.

d) A medium which additionally contains one or more compounds of the formula III,

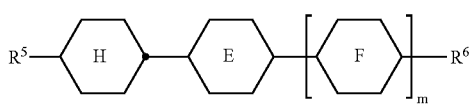

in which

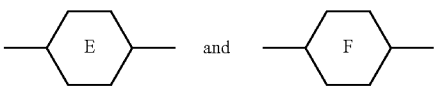

are each independently

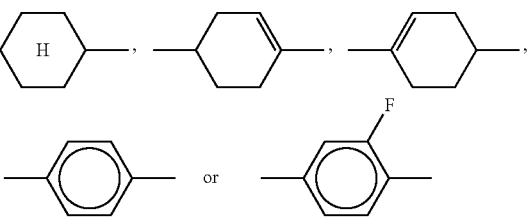

$R^5$ and $R^6$ are each independently alkyl or alkoxy with 1 to 8 C atoms where one or more $CH_2$-groups in these radicals can be replaced by —CH=CH— or —O—, and
m is 0, 1 or 2.

Preferred compounds of the formula III are selected from the following group of compounds:

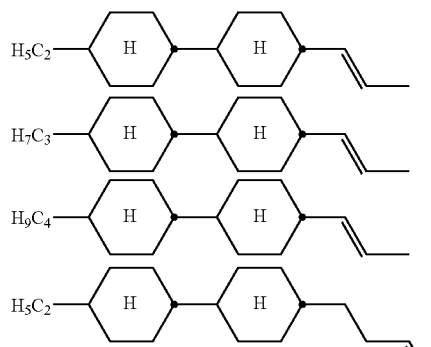

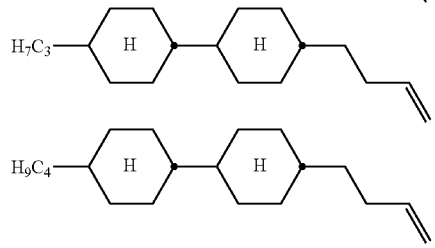

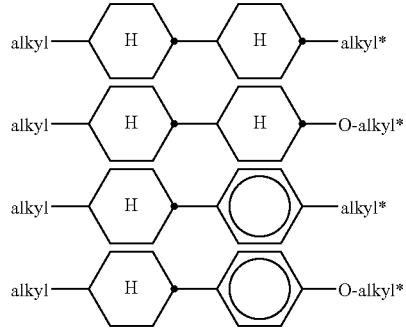

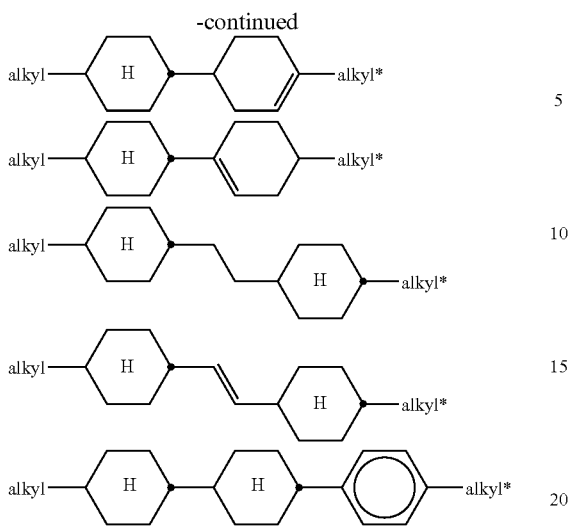

in which alkyl and alkyl* each, independently of one another, denote a straight-chain alkyl radical having 1-6 C atoms.

e) A medium in which the proportion of compounds of the formula I in the mixture as a whole is from 2 to 45% by weight.

f) A medium in which the proportion of compounds of the formula I* in the mixture as a whole is at least 5-30% by weight.

g) A medium in which the proportion of compounds of the formula III in the mixture as a whole is from 0-20% by weight, preferably from 5-30%.

h) A liquid-crystalline medium containing at least one compound selected from the formulae IIa to IIv

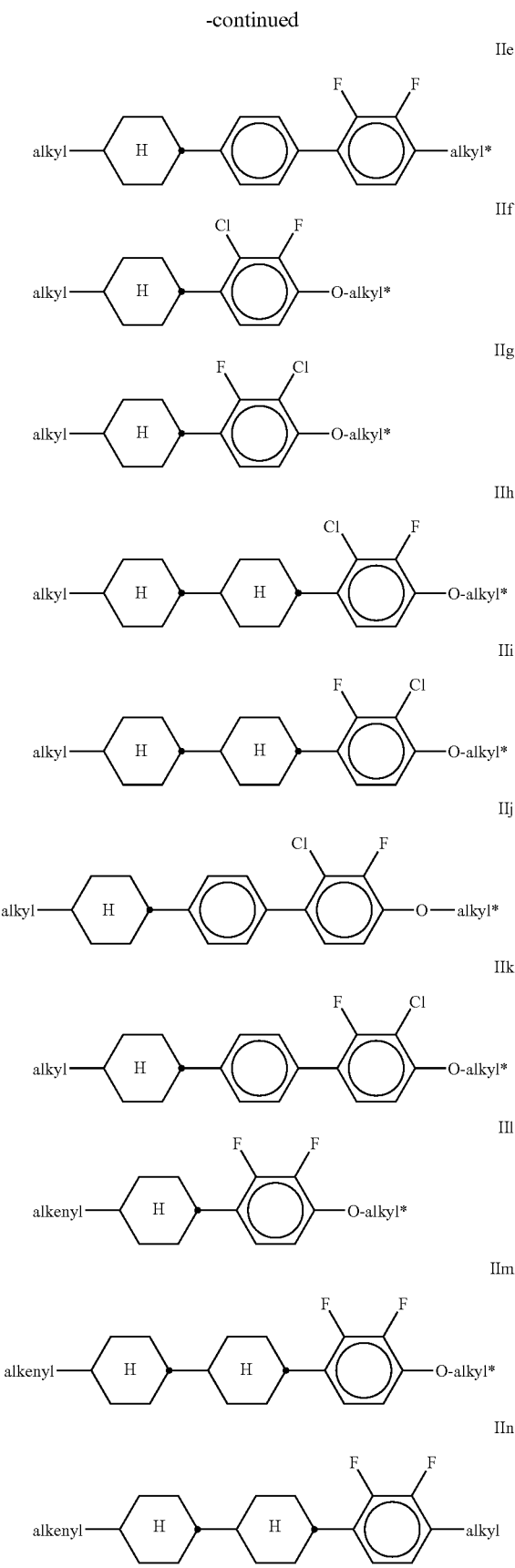

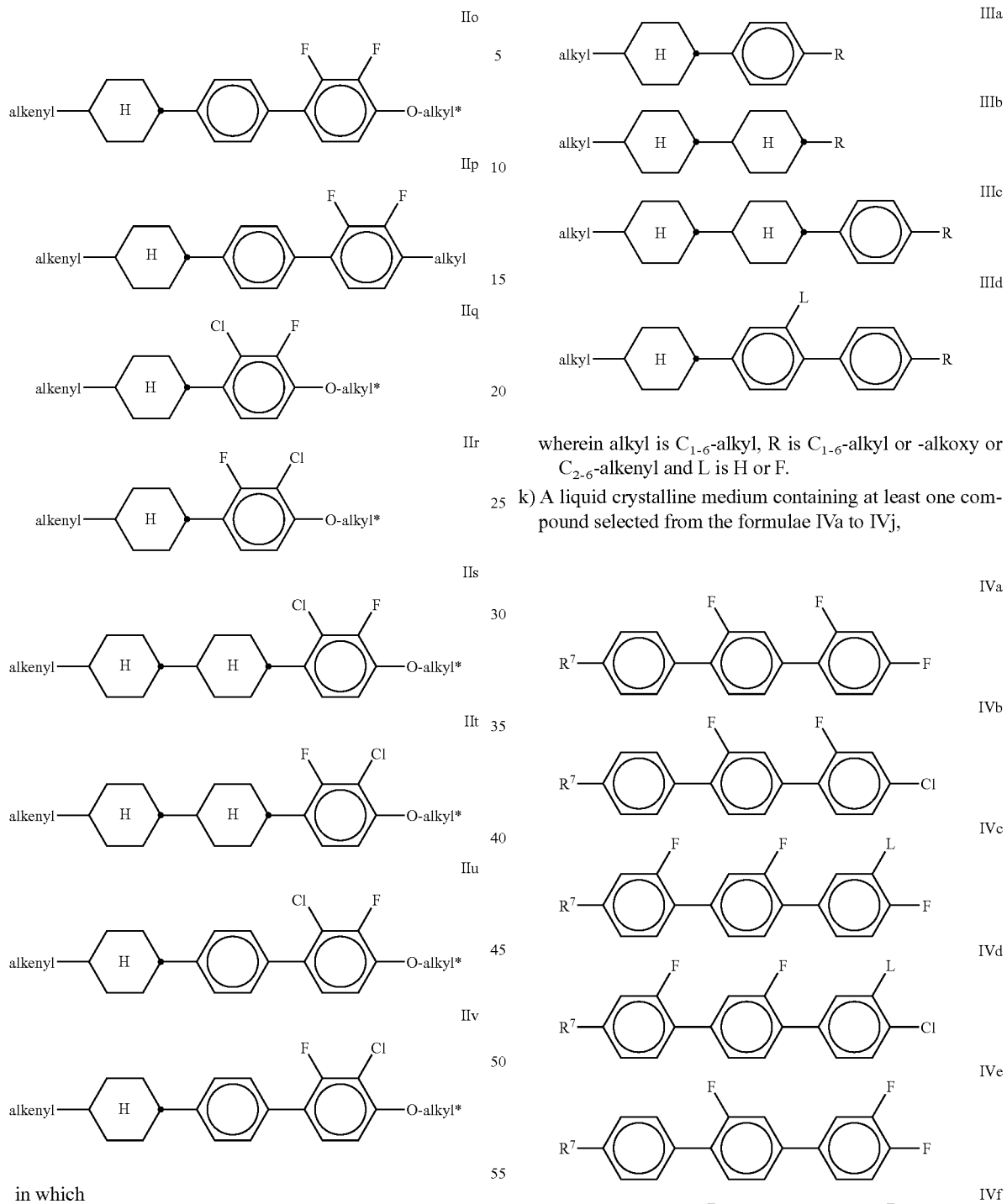

in which
alkyl and
alkyl* are each independently $C_{1-6}$-alkyl,
alkenyl is $C_{2-6}$-alkenyl, preferably $CH_2$=CH, $CH_2$=CHCH$_2$CH$_2$, $CH_3$CH=CHCH$_2$CH$_2$, $CH_3$CH=CH
in particular containing at least one compound of the formula IIa, IIb, IIc or IId.

j) A liquid crystalline medium containing at least three compounds selected from the formulae IIIa to IIId:

wherein alkyl is $C_{1-6}$-alkyl, R is $C_{1-6}$-alkyl or -alkoxy or $C_{2-6}$-alkenyl and L is H or F.

k) A liquid crystalline medium containing at least one compound selected from the formulae IVa to IVj, -continued

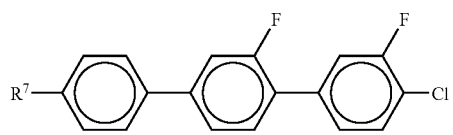
IVh

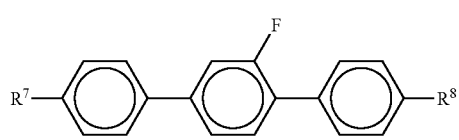
IVi

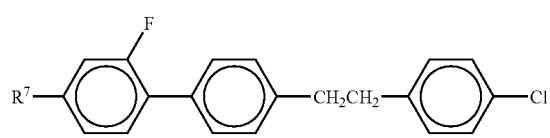
IVj wherein
R⁷ and R⁸ have the same meaning as given for $R^1$, and
L is H, F or Cl.
l) A liquid-crystalline medium essentially comprising:
  2-45% by weight of one or more compounds of the formula I,
  5-30% by weight of one or more compounds of the formula I*,
  20-85% by weight of one or more compounds of the formula II,
  0-20% by weight of one or more compounds of the formula III.
m) Liquid-crystalline medium which additionally comprises one or more tetracyclic compounds of the formulae

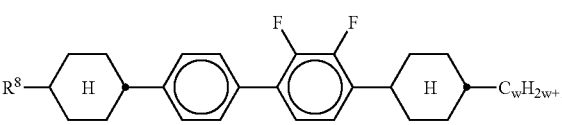

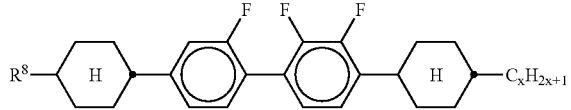

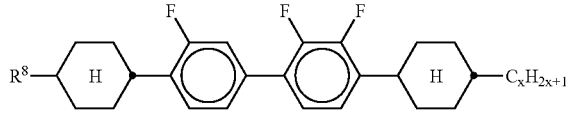

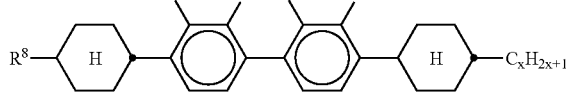

in which
R⁸ has one of the meanings indicated for $R^1$ in Claim 1, and
w and x each, independently of one another, denote 1 to 6.
n) Liquid-crystalline medium which additionally comprises one or more compounds of the formula

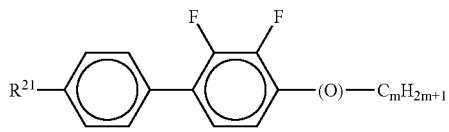

preferably in amounts of >3% by weight, in particular ≧5% by weight and very particularly preferably 5-25% by weight,
where
$R^{21}$ has the meanings indicated for $R^1$, and m denotes 1-6.
o) Liquid-crystalline medium additionally comprising one or more bi-phenyls of the formulae B-1 to B-4

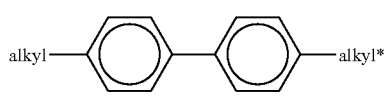
B-1

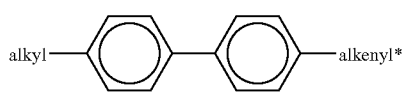
B-2

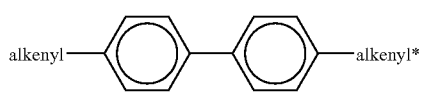
B-3

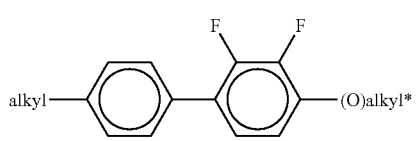
B-4 in which
alkyl and alkyl* each, independently of one another, denote a straight-chain alkyl having 1-6 C atoms, and
alkenyl and alkenyl* each, independently of one another, denote a straight-chain alkenyl radical having 2-6 C atoms.
The proportion of the biphenyls of the formulae B-1 to B-4 in the mixture as a whole is preferably at least 3% by weight, in particular ≧5% by weight.
Of the compounds of the formulae B-1 to B-4, the compounds of the formulae B-1 and B-4 are particularly preferred.
Particularly preferred biphenyls are

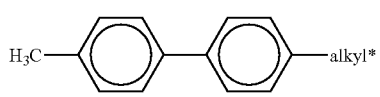
B-1a

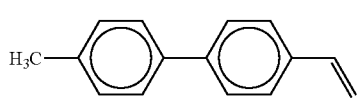
B-2a

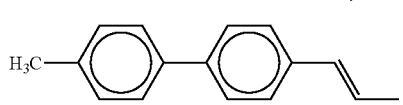
B-2b

-continued

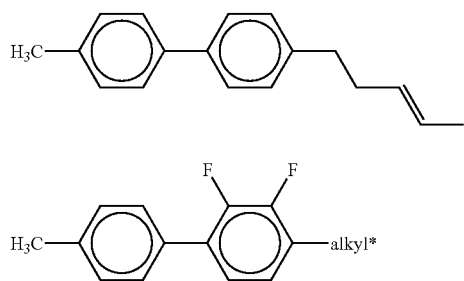

B-2c

B-4a

The medium according to the invention particularly preferably comprises one or more compounds of the formulae B-1a and/or B-2c.

p) Liquid-crystalline medium which additionally comprises one or more compounds of the formulae

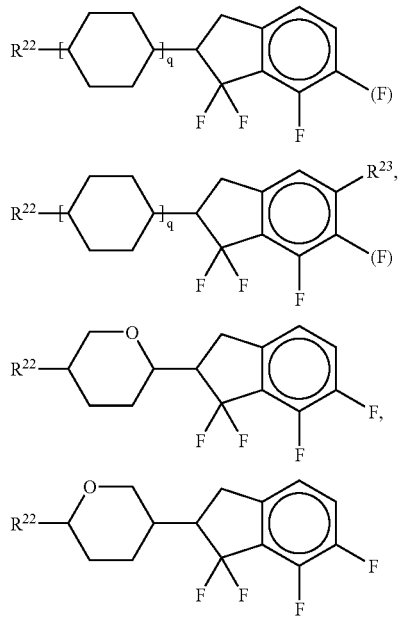

preferably in amounts of >3% by weight, in particular ≧5% by weight, and very particularly preferably 5-25% by weight,
where
$R^{22}$ has the meanings indicated for $R^1$, and $R^{23}$ denotes $CH_3$, $C_2H_5$ or n-$C_3H_7$, and q denotes 1 or 2.

q) Liquid-crystalline medium additionally comprising at least one compound of the formulae Z-1 to Z-15

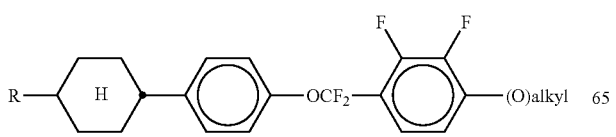

Z-1

-continued

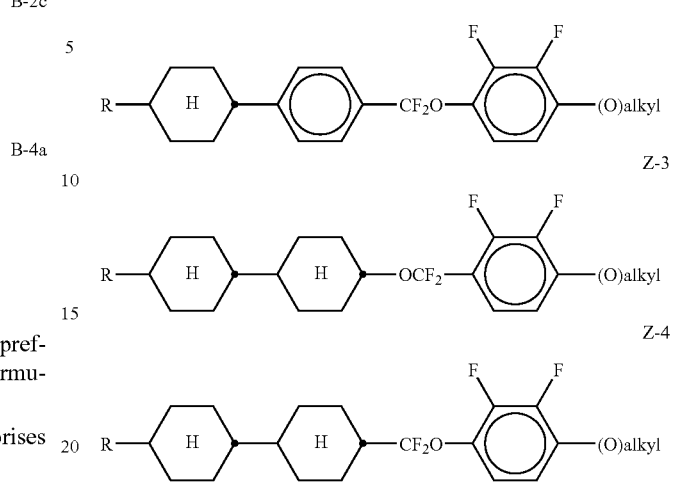

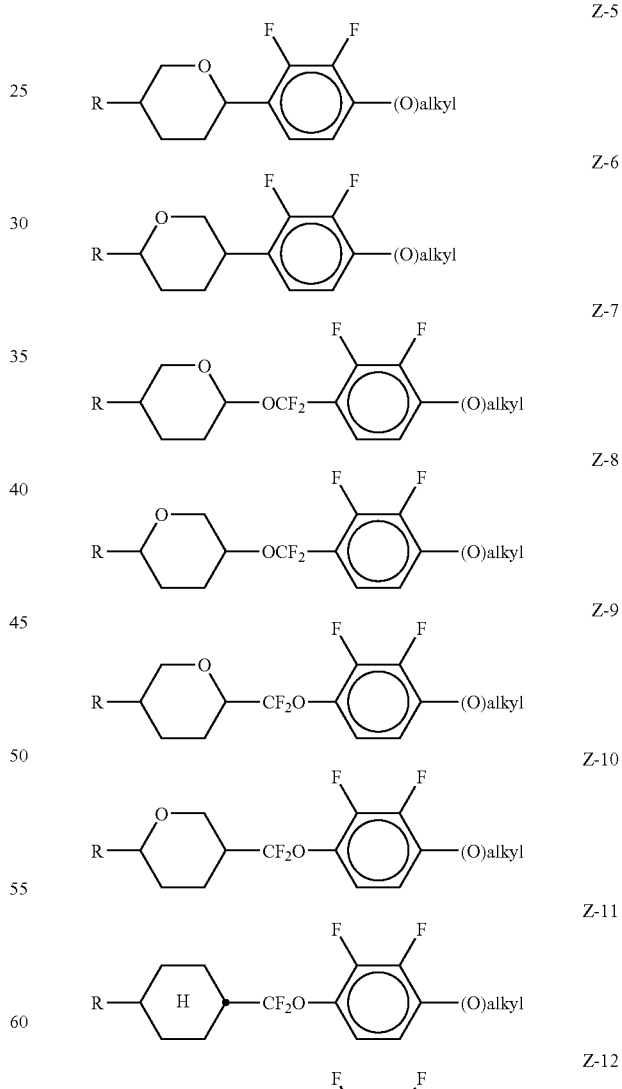

-continued

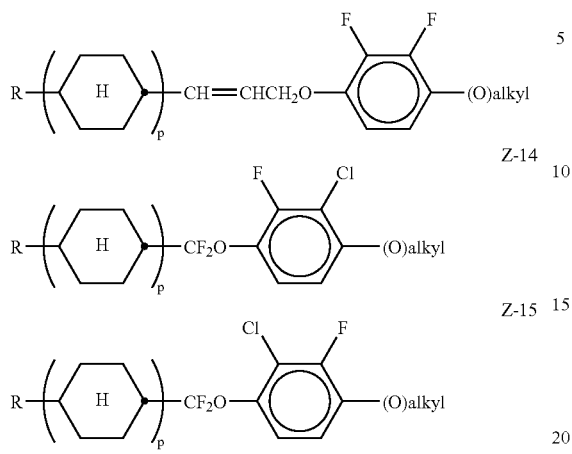

in which R and alkyl have the meanings indicated above, and p is 1 or 2,
preferably in amounts of ≧5% by weight, in particular ≧10% by weight.

Particular preference is given to media which comprise one, two or more compounds of the formulae Z-1 to Z-9 and additionally one, two or more compounds of the formula II. Mixtures of this type preferably comprise ≧10% by weight of compounds of the formula II.

r) Liquid-crystalline medium comprising at least one compound of the formulae O-1 to O-12

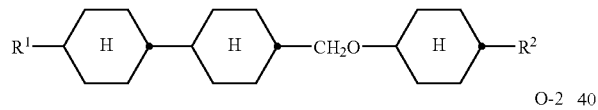

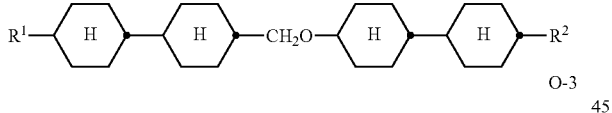

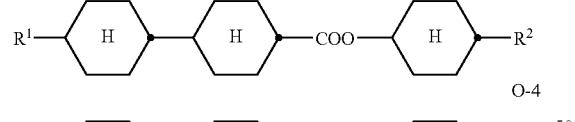

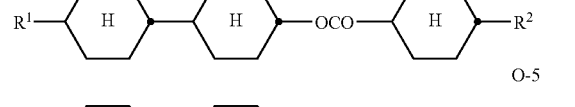

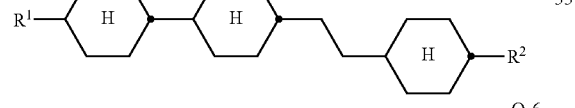

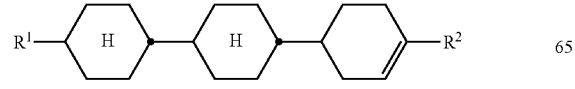

-continued

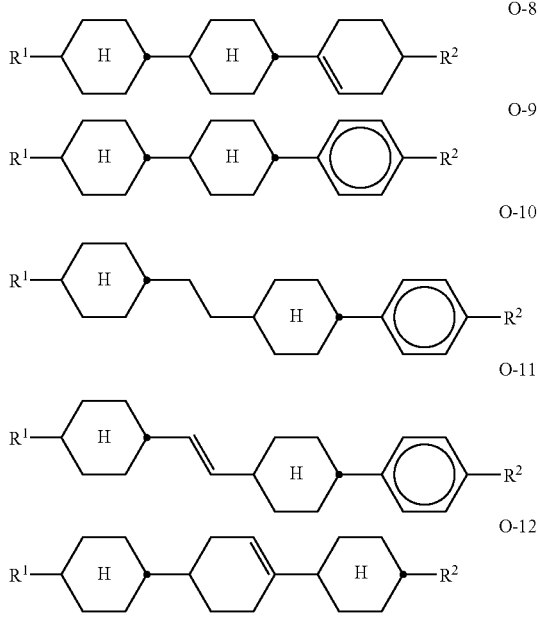

in which $R^1$ and $R^2$ have the meanings as indicated in Claim 1, and $R^1$ and $R^2$ each, independently of one another, preferably denote straight-chain alkyl, furthermore alkenyl.

s) Preferred liquid-crystalline media according to the invention comprise one or more substances which contain a tetrahydronaphthyl or naphthyl unit, such as, for example, the compounds of the formulae N-1 to N-5

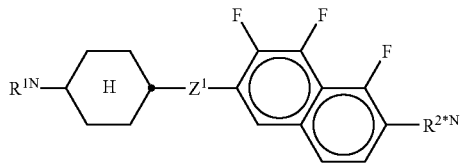

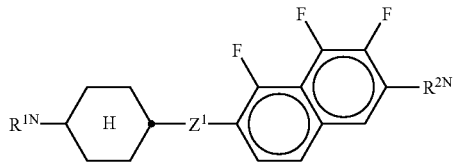

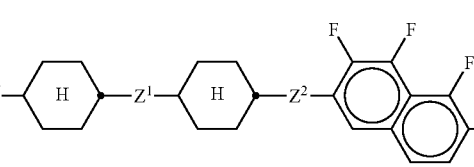

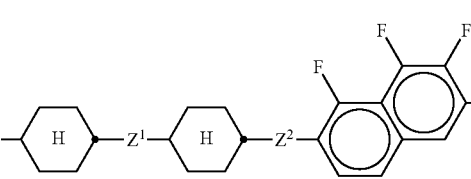

-continued

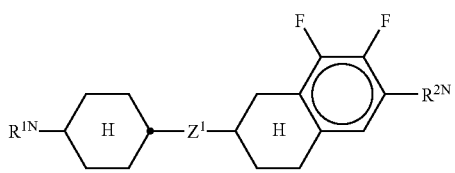
N-5 in which $R^{1N}$ and $R^{2N}$ each, independently of one another, have the meanings indicated for $R^1$, preferably denote straight-chain alkyl, straight-chain alkoxy or straight-chain alkenyl, and Z, $Z^1$ and $Z^2$ each, independently of one another, denote
—$C_2H_4$—, —CH═CH—, —$(CH_2)_4$—, —$(CH_2)_3O$—, —$O(CH_2)_3$—, —CH═CHCH$_2$CH$_2$—, —CH$_2$CH$_2$CH═CH—, —CH$_2$O—, —OCH$_2$—, —COO—, —OCO—, —$C_2F_4$—, —CF═CF—, —CF═CH—, —CH═CF—, —CF$_2$O—, —OCF$_2$—, —CH$_2$— or a single bond.

t) Preferred mixtures comprise one or more difluorobenzochromane compounds of the formula BC

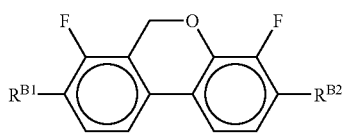

in which
$R^{B1}$ and $R^{B2}$ each, independently of one another, have the meaning of $R^1$, preferably in amounts of 3 to 20% by weight, in particular in amounts of 3 to 15% by weight.

Particularly preferred compounds of the formula BC are compounds BC-1 to BC-7

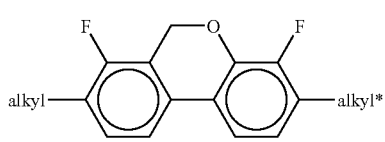
BC-1

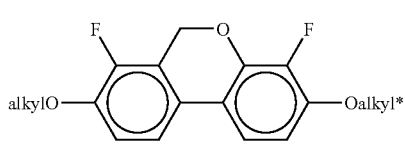
BC-2

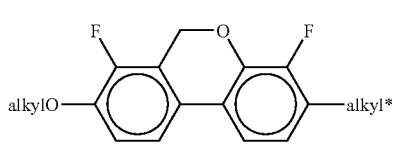
BC-3

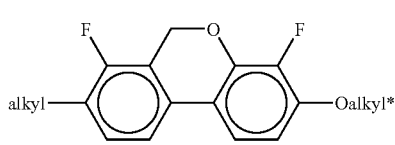
BC-4

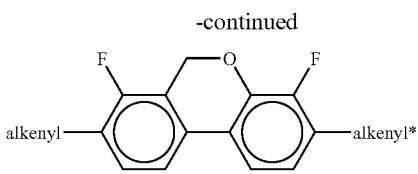
BC-5

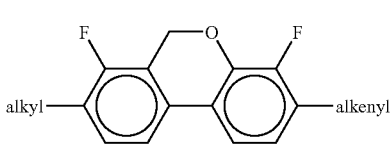
BC-6

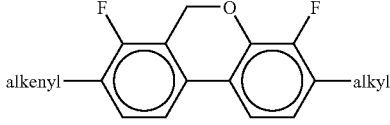
BC-7 in which
alkyl and alkyl* each, independently of one another, denote a straight-chain alkyl radical having 1-6 C atoms, and
alkenyl and
alkenyl* each, independently of one another, denote a straight-chain alkenyl radical having 2-6 C atoms.

Very particularly preferred mixtures comprise one, two or three compounds of the formula BC-2.

u) Medium additionally contains one or more compounds selected from the group of compounds of the formula P

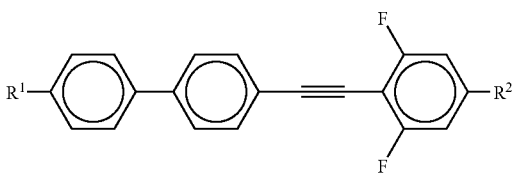
P-1

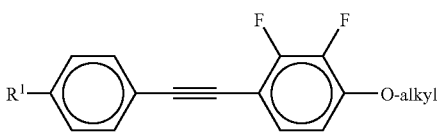
P-2

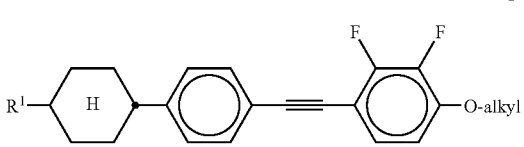
P-3 wherein
$R^1$ and $R^2$ have the meanings given in Claim 1.

In the formulae P-1 to P-3 $R^1$ are preferably alkyl. $R^2$ is preferably alkyl. "alkyl" is a straight-chain alkyl with 1-6 carbon atoms. The compounds of the formula P are preferably used in the mixtures in amounts of 5-35%.

The invention furthermore relates to an electro-optical projection display having active or passive matrix addressing based on the ECB effect, characterised in that it contains, as dielectric, a liquid-crystalline medium as described above.

The liquid-crystalline medium according to the invention preferably has a nematic phase from ≦20° C. to ≧70° C., particularly preferably from $\leq 30°$ C. to $\geq 80°$ C., very particularly preferably from $\leq 40°$ C. to $\geq 90°$ C.

The term "have a nematic phase" here means on the one hand that no smectic phase and no crystallisation are observed at low temperatures at the corresponding temperature and on the other hand that clearing does not occur on heating from the nematic phase. The investigation at low temperatures is carried out in a flow viscometer at the corresponding temperature and is checked by storage in test cells having a layer thickness corresponding to the electro-optical application for at least 100 hours.

If the storage stability at a temperature of $-20°$ C. in a corresponding test cell is 1000 h or more, the medium is regarded as stable at this temperature. At temperatures of $-30°$ C. and $-40°$ C., the corresponding times are 500 h and 250 h respectively. At high temperatures, the clearing point is measured by conventional methods in capillaries.

The liquid-crystal mixture preferably has a nematic phase range of at least 60 K and a flow viscosity $v_{20}$ of at most 30 mm$^2 \cdot$s$^{-1}$ at $20°$ C.

The liquid-crystal mixture according to the invention has a $\Delta\varepsilon$ of $-0.5$ to $-8.0$, in particular of $-3.0$ to $-6.0$, where $\Delta\varepsilon$ denotes the dielectric anisotropy. The rotational viscosity $\gamma_1$ is preferably $<200$ mPa·s, in particular $<170$ mPa·s.

The values of the birefringence $\Delta n$ in the liquid-crystal mixture are generally between 0.07 and 0.25, preferably between 0.08 and 0.24.

The liquid-crystal media according to the invention have a negative dielectric anisotropy and have relatively high absolute values of the dielectric anisotropy ($|\Delta\varepsilon|$), which are preferably in the range from $\geq 2.0$ to $\geq 4.5$.

The liquid-crystal media according to the invention have relatively small values for the threshold voltage ($V_0$). They are preferably in the range from 1.7 V to 2.5 V, particularly preferably $\leq 2.3$ V and very particularly preferably $\leq 2.2$ V.

In addition, the liquid-crystal media according to the invention have high values for the voltage holding ratio in liquid-crystal cells. In freshly filled cells at $20°$ C. in the cells, they are $\geq 95\%$, preferably $\geq 97\%$ and very particularly preferably $\geq 99\%$ and after 5 minutes in the oven at $100°$ C. in the cells they are $\geq 90\%$, preferably $\geq 93\%$ and very particularly preferably $\geq 98\%$.

In general, liquid-crystal media having a low addressing voltage or threshold voltage have a lower voltage holding ratio than those having a greater addressing voltage or threshold voltage and vice versa.

For the present invention, the term "dielectrically positive compounds" denotes compounds having a $\Delta\varepsilon > 1.5$, the term "dielectrically neutral compounds" denotes those having $-1.5 \leq \Delta\varepsilon \leq 1.5$ and the term "dielectrically negative compounds" denotes those having $\Delta\varepsilon < -1.5$. The dielectric anisotropy of the compounds is determined here by dissolving 10% of the compounds in a liquid-crystalline host and determining the capacitance of the resultant mixture in at least one test cell in each case having a layer thickness of 20 µm with homeotropic and with homogeneous surface alignment at 1 kHz. The measurement voltage is typically 0.5 V to 1.0 V, but is always lower than the capacitive threshold of the respective liquid-crystal mixture investigated.

The host mixture used for dielectrically positive and dielectrically neutral compounds is ZLI-4792 and the host mixture used for dielectrically negative compounds is ZLI-2857, both from Merck KGaA, Germany. The values for the respective compounds to be investigated are obtained from the change in the dielectric constants of the host mixture after addition of the compound to be investigated and extrapolation to 100% of the compound employed. 10% of the compound to be investigated are dissolved in the host mixture. If the solubility of the substance is too low for this, the concentration is halved in steps until the investigation can be carried out at the desired temperature.

All temperature values indicated for the present invention are in $°$ C.

For the present invention, the term "threshold voltage" relates to the capacitive threshold ($V_0$), also known as the Freedericksz threshold, unless explicitly indicated otherwise. In the examples, as is generally customary, the optical threshold for 10% relative contrast ($V_{10}$) is also determined and quoted.

The electro-optical properties, for example the threshold voltage ($V_0$) (capacitive measurement) and the optical threshold ($V_{10}$), are, like the switching behaviour, determined in test cells produced at Merck KGaA. The measurement cells have soda-lime glass substrates and are produced in an ECB or VA configuration with polyimide alignment layers (SE-1211 with diluent **26 (mixing ratio 1:1), both from Nissan Chemicals, Japan), which are rubbed perpendicular to one another. The area of the transparent, virtually square ITO electrodes is 1 cm$^2$. The layer thickness of the test cells used is selected in accordance with the birefringence of the liquid-crystal mixture investigated in such a way that the optical retardation is (0.33±0.01) µm. The polarisers, one of which is located in front of and one of which is located behind the cell, form, with their absorption axes, an angle of $90°$ to one another and are on their respective adjacent substrate with these axes parallel to the rubbing direction. The layer thickness is usually about 4.0 µm. The cells are filled by means of capillary action under atmospheric pressure and are investigated in the unsealed state.

Unless indicated otherwise, a chiral dopant is not added to the liquid-crystal mixtures used, but the latter are also particularly suitable for applications in which doping of this type is necessary.

The electro-optical properties and the response times of the test cells are determined in a DMS 301 measuring instrument from Autronic-Melchers, Karlsruhe, Germany, at a temperature of $20°$ C. The addressing wave shape used is a rectangular wave having a frequency of 60 Hz. The voltage is quoted as $V_{rms}$ (root mean square). During measurement of the response times, the voltage is increased from 0 V to twice the value of the optical threshold ($2V_{10}$) and back. The response times quoted apply to the entire time that passes from the change in the voltage until 90% of the respective total change in the light intensity occurs, i.e. $\tau_{on} \equiv t(0\%$ to $>90\%)$ and $t_{off} \equiv t(100\%$ to $>10\%)$, i.e. also include the respective delay times. Since the individual response times are dependent on the addressing voltage, the sum of the two individual response times ($\Sigma = \tau_{on} + \tau_{off}$) or the average response time ($\tau_{av.} = (\tau_{on} + \tau_{off})/2$) is also quoted in order to improve the comparability of the results.

The mixtures according to the invention are suitable for all active and passive VA-TFT applications, such as, for example, VAN, MVA, (S)-PVA and ASV. They are furthermore suitable for IPS (in-plane switching), FFS (fringe field switching) and PALC applications of negative $\Delta\varepsilon$.

The nematic liquid-crystal mixtures in the displays according to the invention generally comprise two components A and B, which themselves consist of one or more individual compounds.

Component A has significantly negative dielectric anisotropy and gives the nematic phase a dielectric anisotropy of $\leq -0.5$. It preferably comprises compounds of the formulae I* and II.

The proportion of component A is preferably between 45 and 100%, in particular between 60 and 100%.

For component A, one (or more) individual compound(s) which has (have) a value of $\Delta\epsilon$ of $\leq -0.8$ is (are) preferably selected. This value must be more negative, the smaller the proportion A in the mixture as a whole.

Component B has pronounced nematogeneity and a flow viscosity of not greater than 30 mm$^2 \cdot$s$^{-1}$, preferably not greater than 25 mm$^2 \cdot$s$^{-1}$, at 20° C.

Particularly preferred individual compounds in component B are extremely low-viscosity nematic liquid crystals having a flow viscosity of not greater than 18 mm$^2 \cdot$s$^{-1}$, preferably not greater than 12 mm$^2 \cdot$s$^{-1}$, at 20° C.

Component B is monotropically or enantiotropically nematic, has no smectic phases and is able to prevent the occurrence of smectic phases down to very low temperatures in liquid-crystal mixtures. For example, if various materials of high nematogeneity are added to a smectic liquid-crystal mixture, the nematogeneity of these materials can be compared through the degree of suppression of smectic phases that is achieved.

A multiplicity of suitable materials is known to the person skilled in the art from the literature. Particular preference is given to compounds of the formula III.

In addition, these liquid-crystal phases may also comprise more than 18 components, preferably 18 to 25 components.

The phases preferably comprise 4 to 15, in particular 5 to 12, and particularly preferably <10, compounds of the formulae I, I* and II and optionally III.

Besides compounds of the formulae I, I* and II, other constituents may also be present, for example in an amount of up to 45% of the mixture as a whole, but preferably up to 35%, in particular up to 10%.

The other constituents are preferably selected from nematic or nematogenic substances, in particular known substances, from the classes of the azoxybenzenes, benzylideneanilines, biphenyls, terphenyls, phenyl or cyclohexyl benzoates, phenyl or cyclohexyl cyclohexanecarboxylates, phenylcyclohexanes, cyclohexylbiphenyls, cyclohexylcyclohexanes, cyclo-hexylnaphthalenes, 1,4-biscyclohexylbiphenyls or cyclohexylpyrimidines, phenyl- or cyclohexyldioxanes, optionally halogenated stilbenes, benzyl phenyl ethers, tolans and substituted cinnamic acid esters.

The most important compounds which are suitable as constituents of liquid-crystal phases of this type can be characterised by the formula X

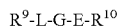  X in which L and E each denote a carbo- or heterocyclic ring system from the group formed by 1,4-disubstituted benzene and cyclohexane rings, 4,4'-disubstituted biphenyl, phenylcyclohexane and cyclohexylcyclohexane systems, 2,5-disubstituted pyrimidine and 1,3-dioxane rings, 2,6-disubstituted naphthalene, di- and tetrahydronaphthalene, quinazoline and tetra-hydroquinazoline, G denotes —CH=CH— —N(O)=N—
—CH—CQ- —CH=N(O)—
—C≡C— —CH$_2$—CH$_2$
—CO—O— —CH$_2$—O—
—CO—S— —CH$_2$—S—
—CH=N— —COO-Phe-COO—
—CF$_2$O— —CF=CF—
—OCF$_2$— —OCH$_2$
—(CH$_2$)$_4$— —(CH$_2$)$_3$O— or or a C—C single bond, Q denotes halogen, preferably chlorine, or —CN, and R$^9$ and R$^{10}$ each denote alkyl, alkenyl, alkoxy, alkanoyloxy or alkoxycarbonyloxy having up to 18, preferably up to 8, carbon atoms, or one of these radicals alternatively denotes CN, NC, NO$_2$, SF$_5$, SCN, NCS, CF$_3$, OCF$_3$, F, Cl or Br.

In most of these compounds, R$^9$ and R$^{10}$ are different from one another, one of these radicals usually being an alkyl or alkoxy group. Other variants of the proposed substituents are also common. Many such substances or also mixtures thereof are commercially available. All these substances can be prepared by methods known from the literature.

It goes without saying for the person skilled in the art that the VA, IPS, FFS or PALC mixture according to the invention may also comprise compounds in which, for example, H, N, O, Cl and F have been replaced by the corresponding isotopes.

The construction of the liquid-crystal displays according to the invention corresponds to the usual geometry, as described, for example, in EP-A 0 240 379.

The following examples are intended to explain the invention without limiting it. Above and below, percentages denote percent by weight; all temperatures are indicated in degrees Celsius.

Besides the compounds of the formulae I and I*, the mixtures according to the invention preferably comprise one or more of the compounds shown below.

The following abbreviations are used:

(m, m, z: each, independently of one another, 1, 2, 3, 4, 5 or 6)

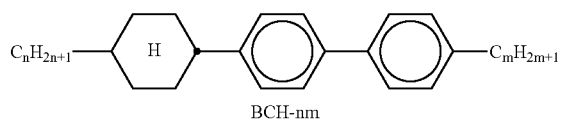
BCH-nm

BCH-nOm

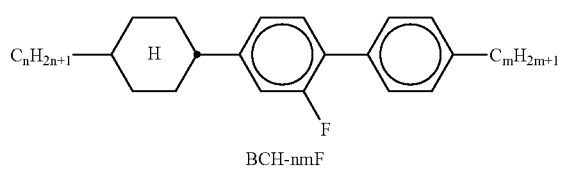
BCH-nmF

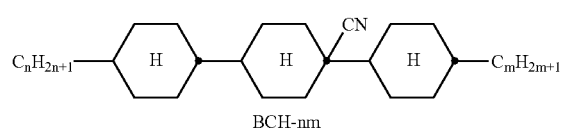
BCH-nm

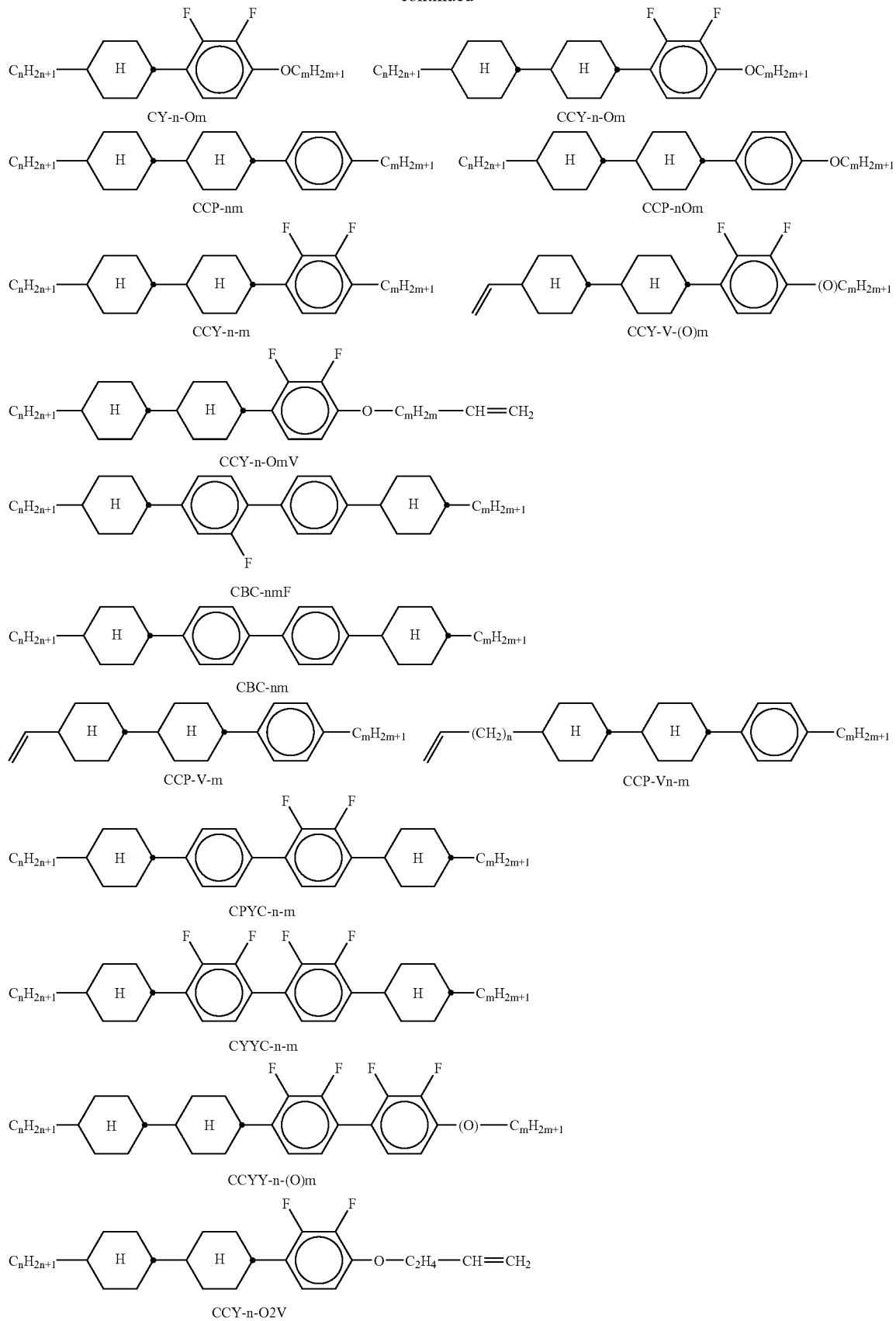

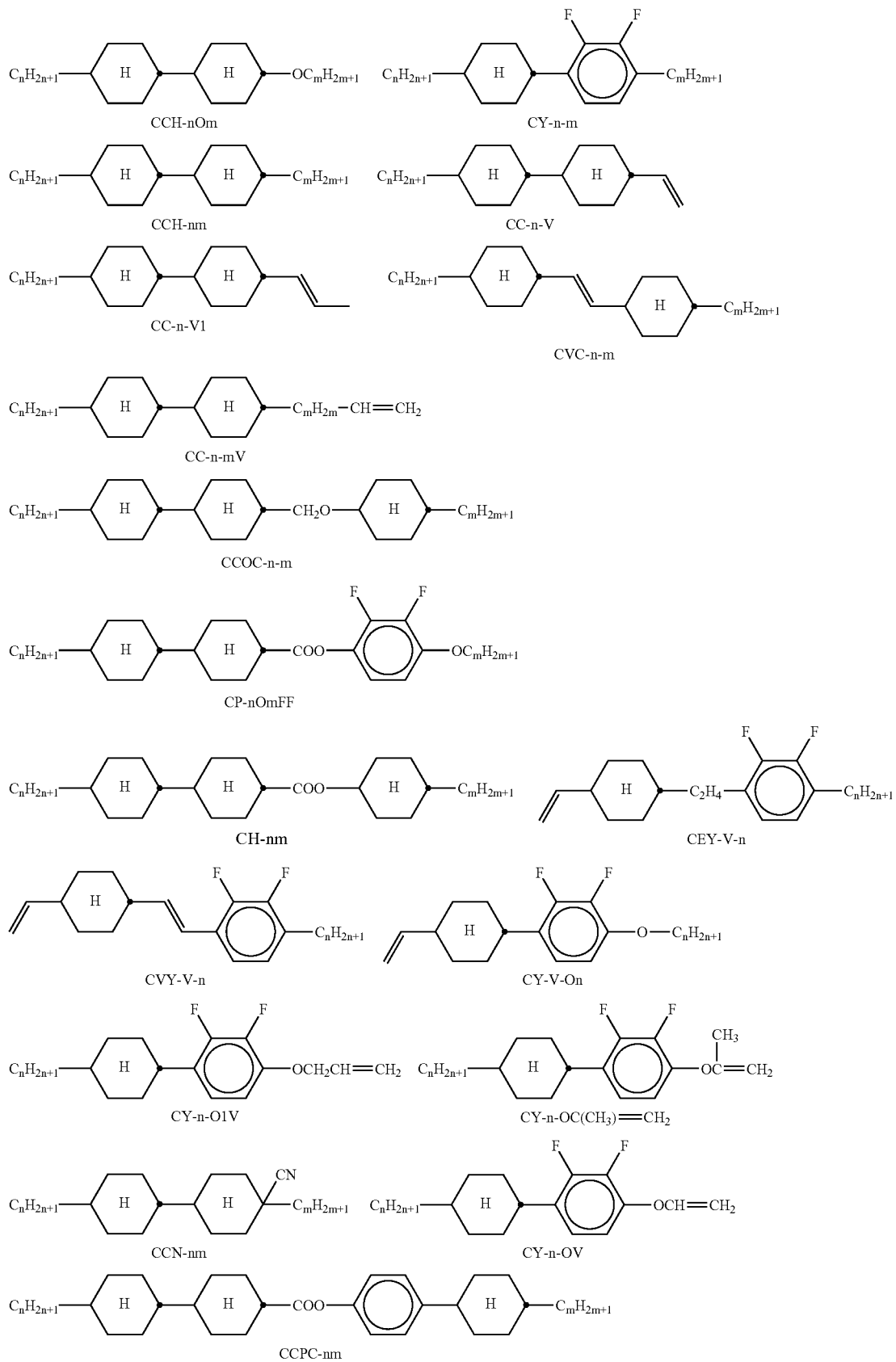

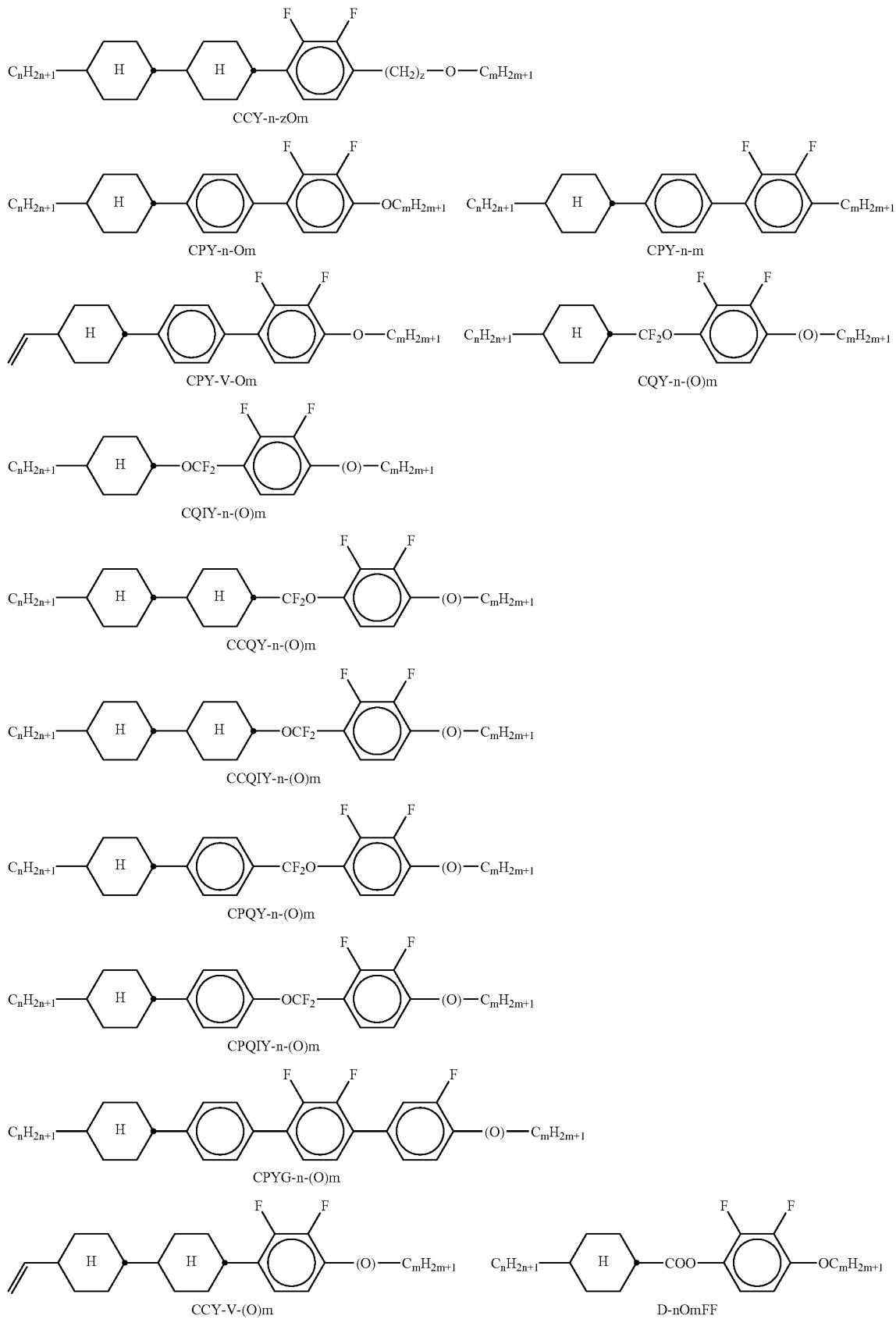

-continued
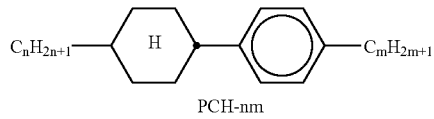
PCH-nm
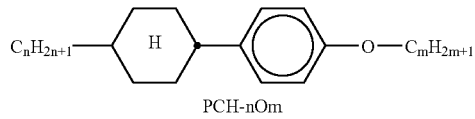
PCH-nOm
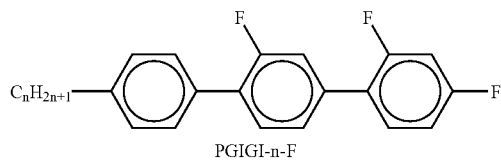
PGIGI-n-F
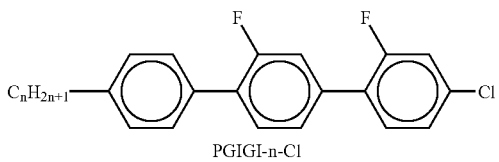
PGIGI-n-Cl
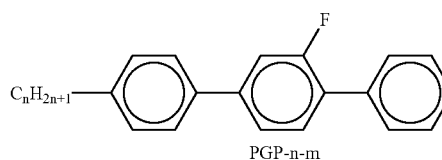
PGP-n-m
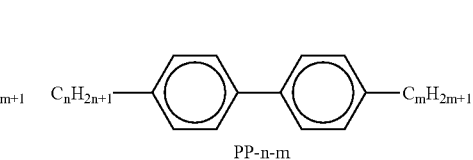
PP-n-m
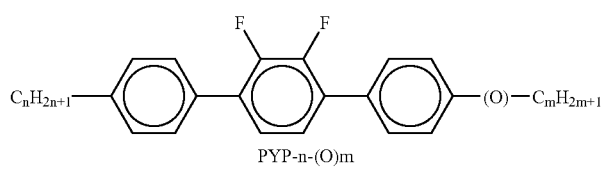
PYP-n-(O)m
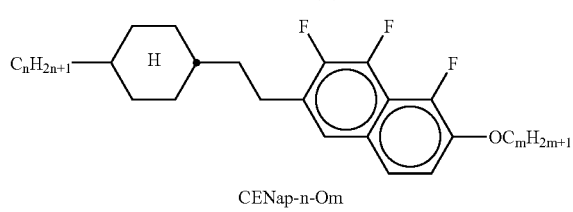
CENap-n-Om
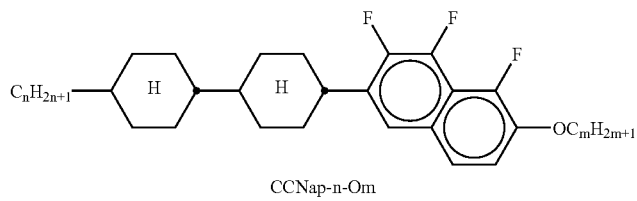
CCNap-n-Om
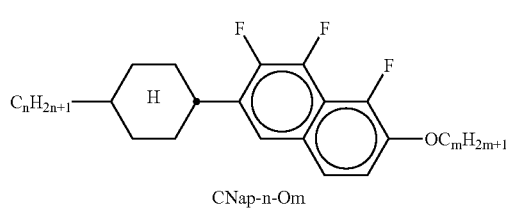
CNap-n-Om
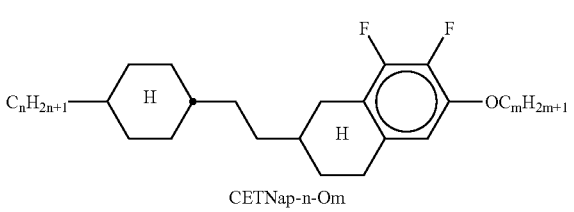
CETNap-n-Om
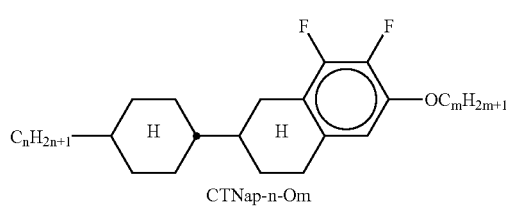
CTNap-n-Om
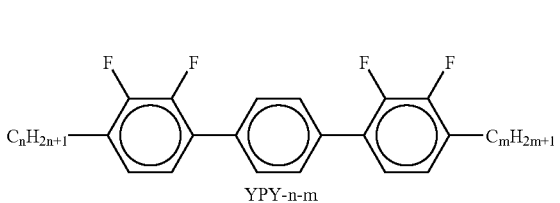
YPY-n-m
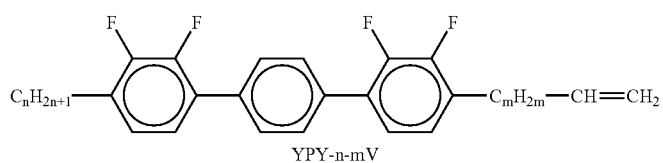
YPY-n-mV -continued
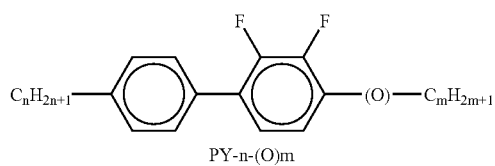
PY-n-(O)m
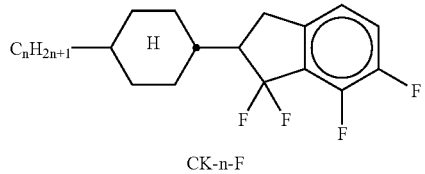
CK-n-F
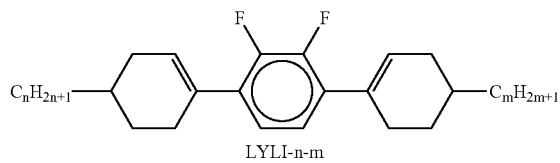
LYLI-n-m
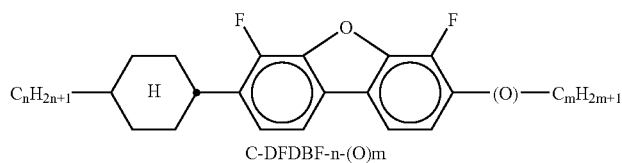
C-DFDBF-n-(O)m
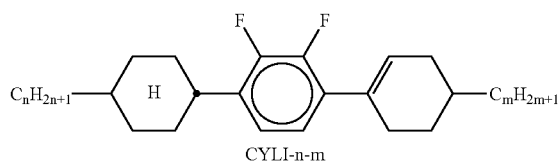
CYLI-n-m
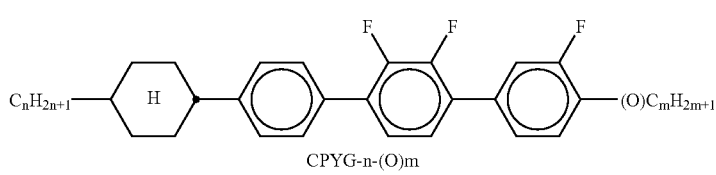
CPYG-n-(O)m
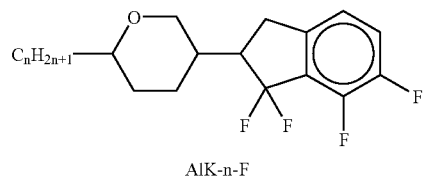
AlK-n-F
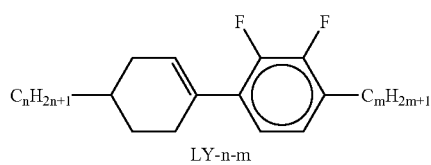
LY-n-m
PTP-nm
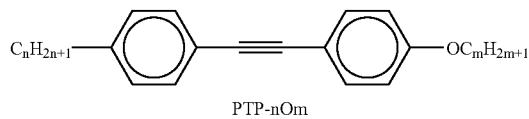
PTP-nOm
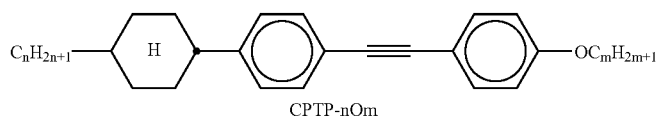
CPTP-nOm
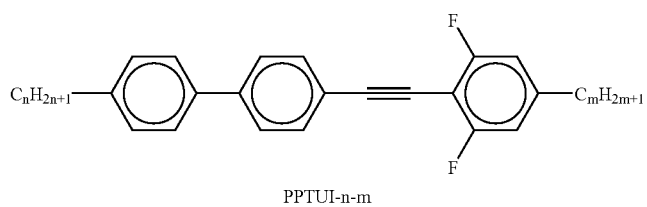
PPTUI-n-m
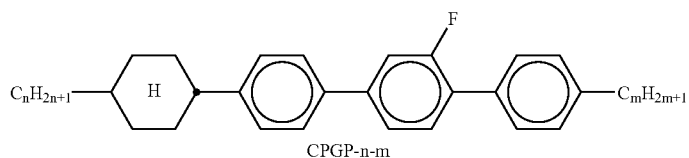
CPGP-n-m

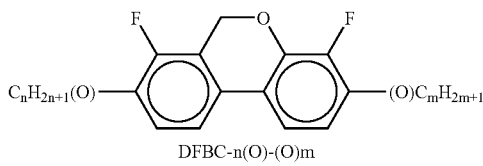

DFBC-n(O)-(O)m

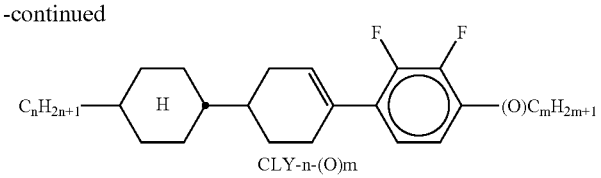

CLY-n-(O)m

The liquid-crystal mixtures which can be used in accordance with the invention are prepared in a manner which is conventional per se. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

The dielectrics may also comprise further additives known to the person skilled in the art and described in the literature, such as, for example, UV absorbers, antioxidants, nanoparticles and free-radical scavengers. For example, 0-15% of pleochroic dyes, stabilisers or chiral dopants may be added.

For example, 0-15% of pleochroic dyes may be added, furthermore conductive salts, preferably ethyldimethyldodecylammonium 4-hexoxybenzoate, tetrabutylammonium tetraphenylboranate or complex salts of crown ethers (cf., for example, Haller et al., Mol. Cryst. Liq. Cryst. Volume 24, pages 249-258 (1973)), may be added in order to improve the conductivity or sub-stances may be added in order to modify the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

Table A shows possible dopants which can be added to the mixtures according to the invention. If the mixtures comprise a dopant, it is employed in amounts of 0.01-4% by weight, preferably 0.1-1.0% by weight.

TABLE A

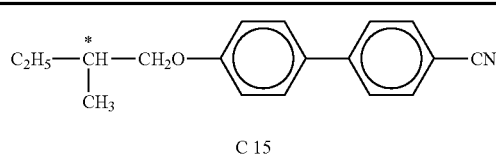

C 15

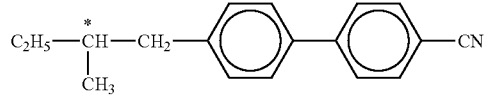

CB 15

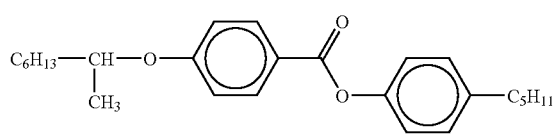

CM 21

TABLE A-continued

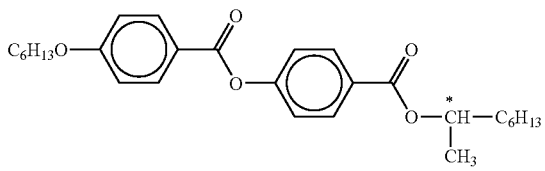

R/S-811

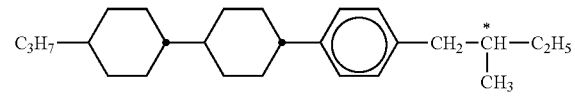

CM 44

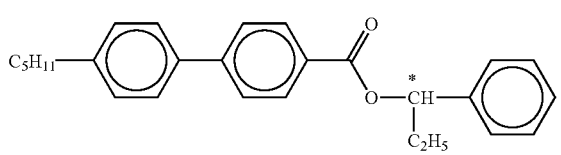

CM 45

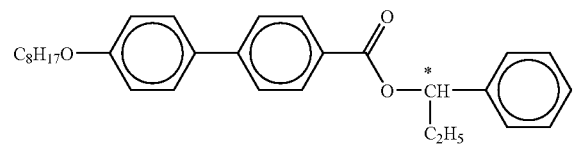

CM 47

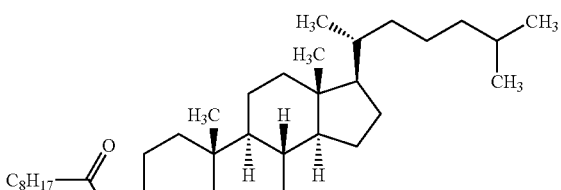

CN

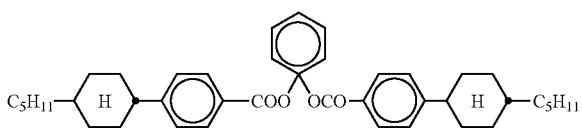

R/S-1011

TABLE A-continued
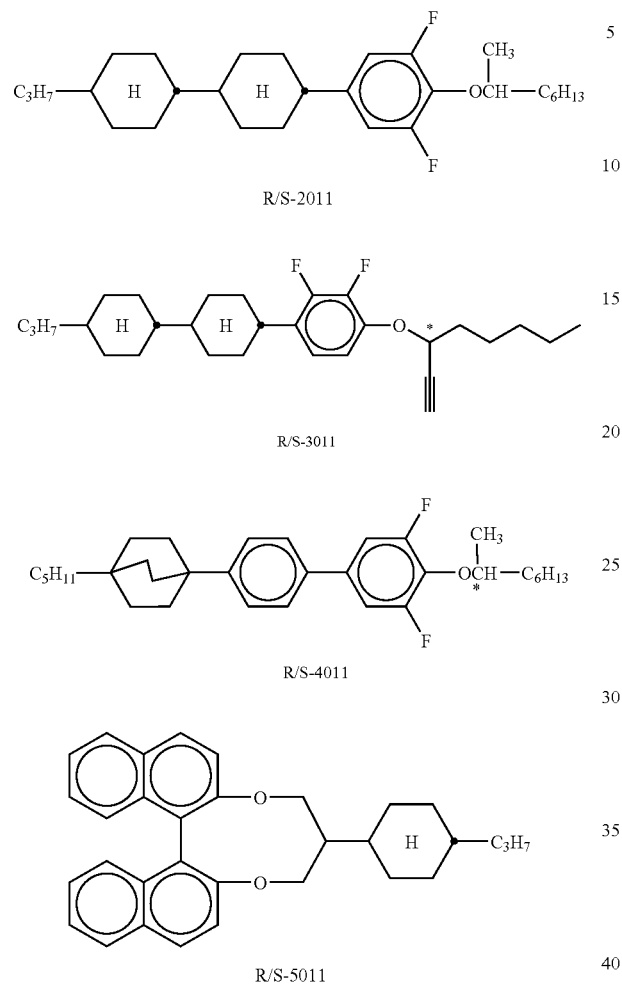
Stabilisers which can be added, for example, to the mixtures according to the invention are shown below in Table B.
TABLE B
TABLE B-continued
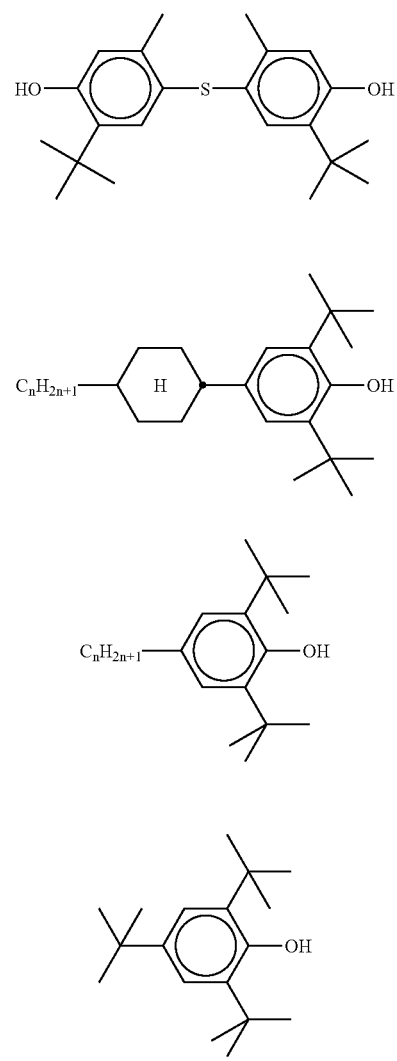
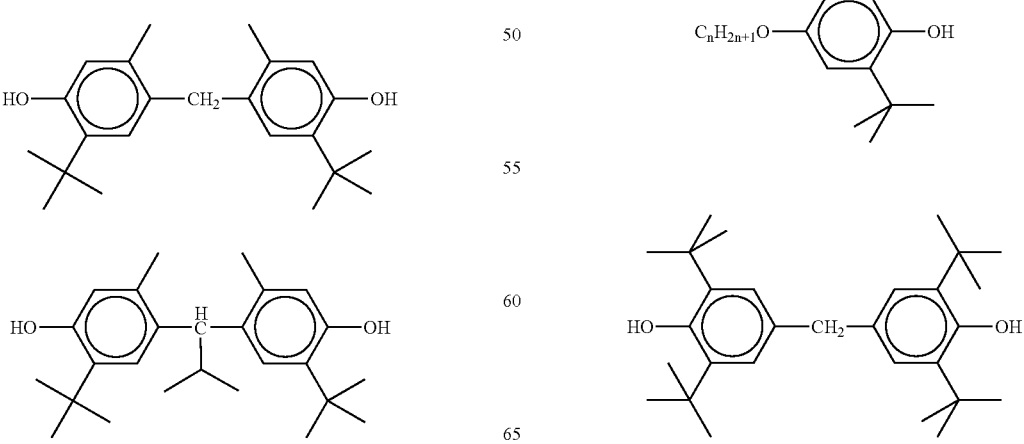

TABLE B-continued
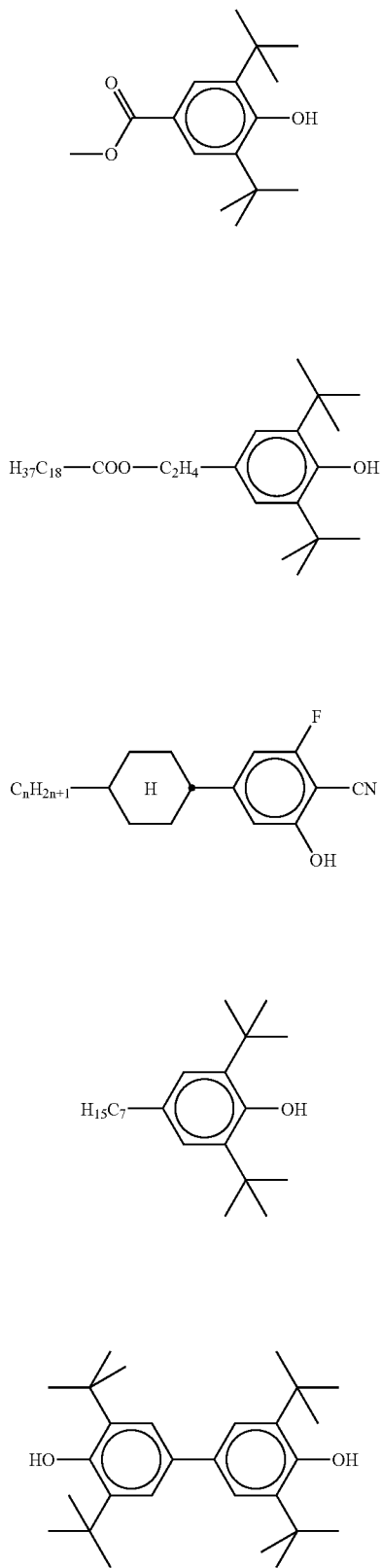
TABLE B-continued
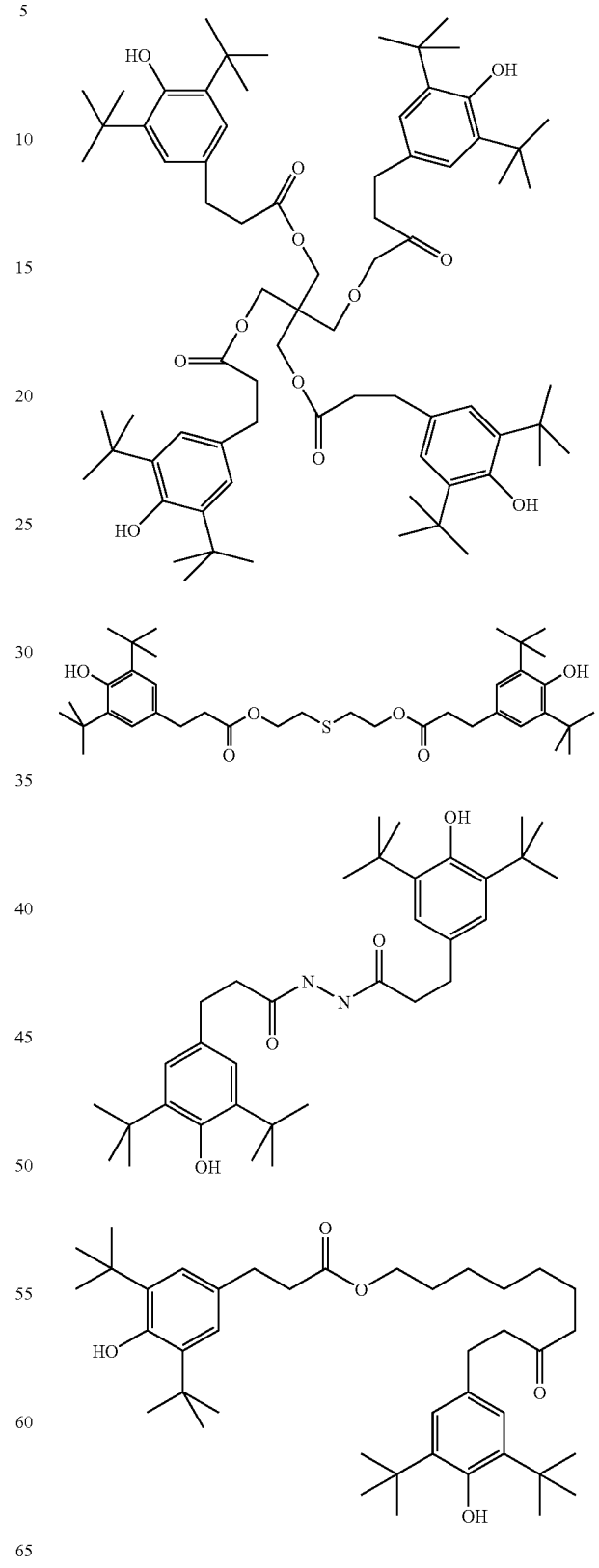

TABLE B-continued
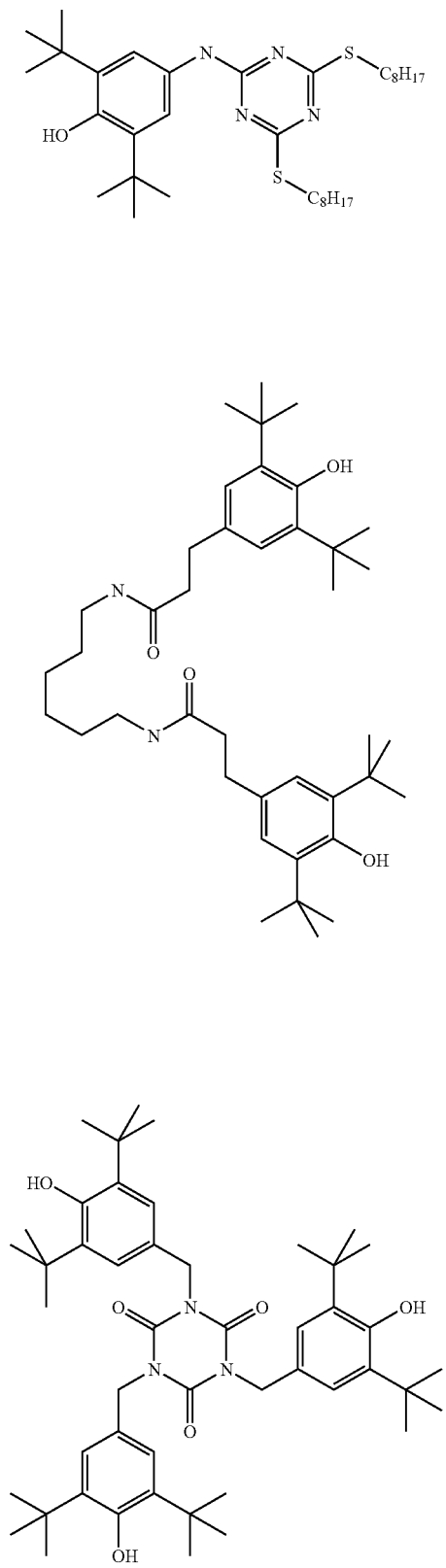
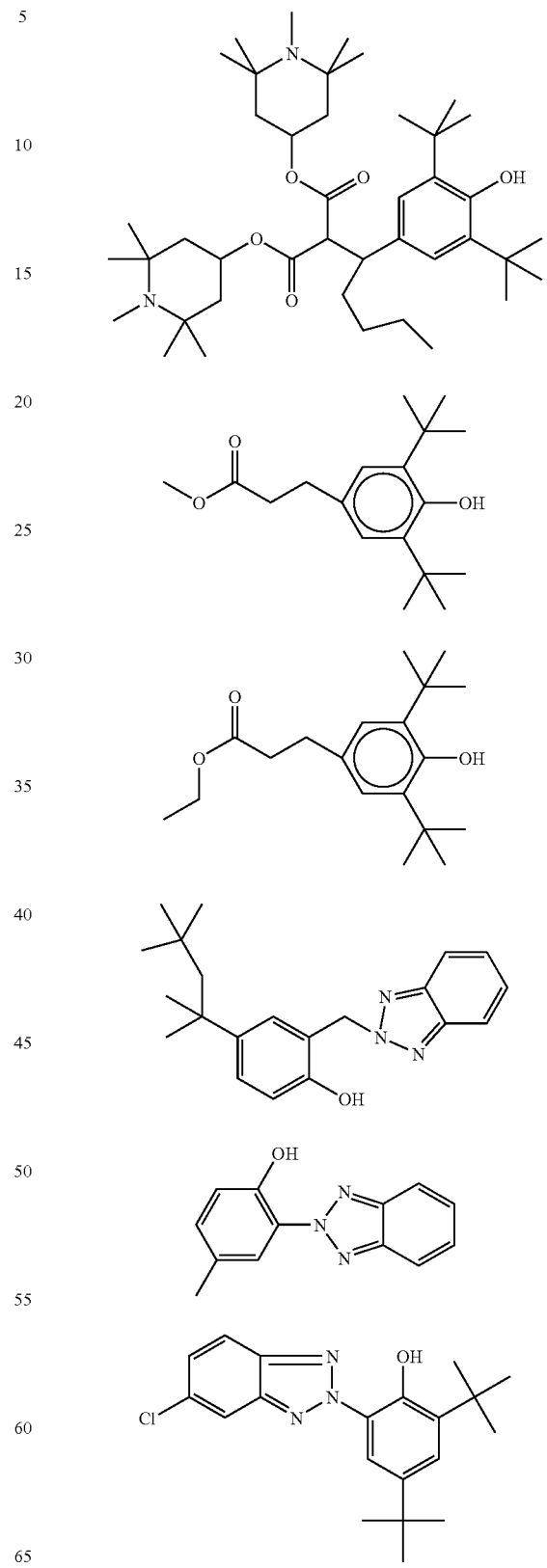

TABLE B-continued
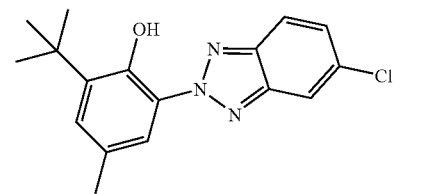
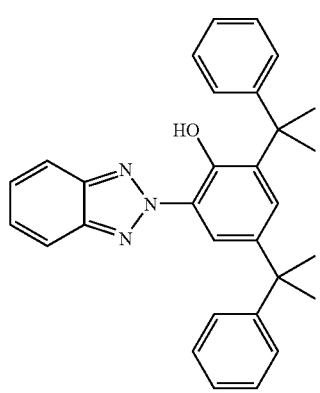
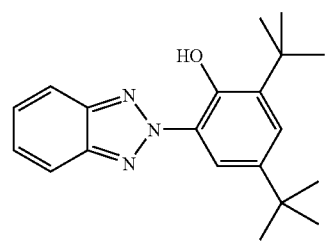
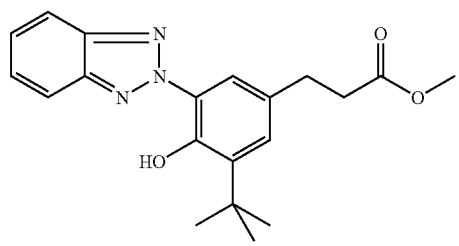
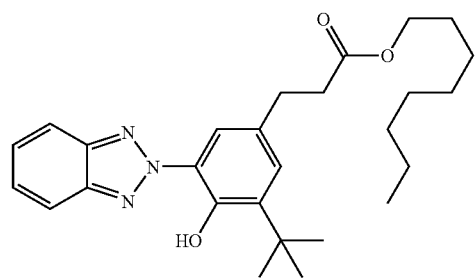
TABLE B-continued
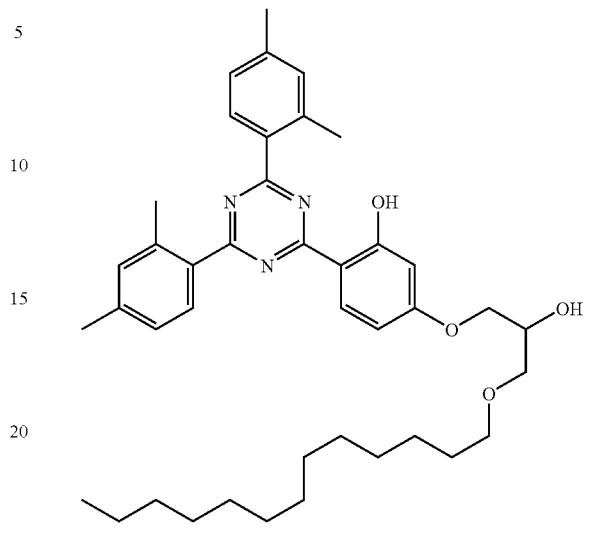
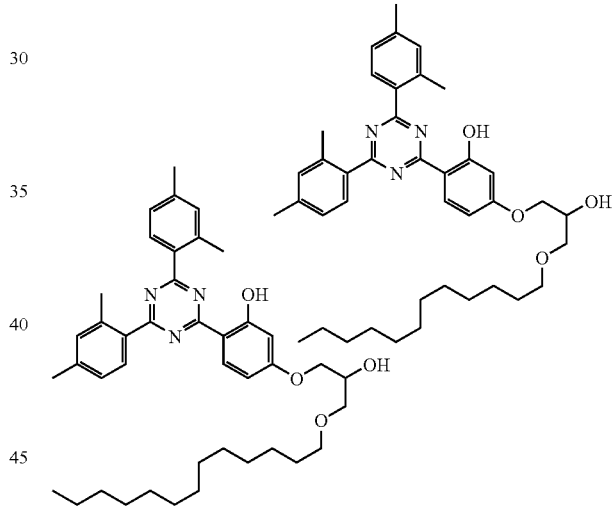
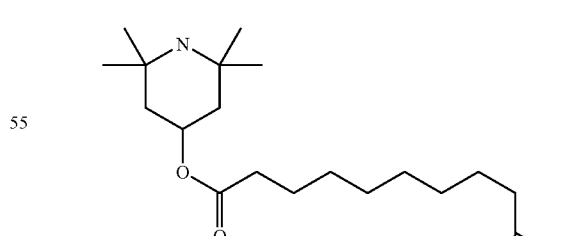

TABLE B-continued

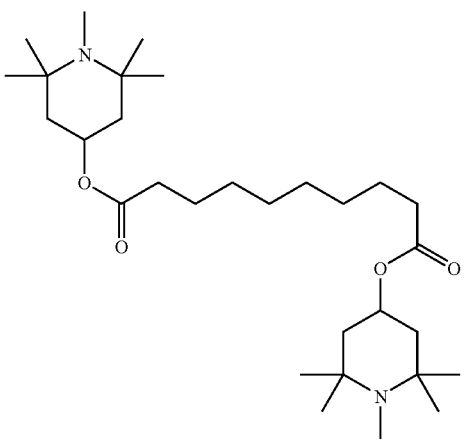

(n = 1-12)

The following examples are intended to explain the invention without limiting it. Above and below, $V_o$ denotes the threshold voltage, capacitive [V] at 20° C.

Δn denotes the optical anisotropy measured at 20° C. and 589 nm

Δ∈ denotes the dielectric anisotropy at 20° C. and 1 kHz cl.p. denotes the clearing point [° C.]

$K_1$ denotes the elastic constant, "splay" deformation at 20° C. [pN]

$K_3$ denotes the elastic constant, "bend" deformation at 20° C. [pN]

$γ_1$ denotes the rotational viscosity measured at 20° C. [mPa·s]

LTS denotes the low-temperature stability (nematic phase), determined in test cells The display used for measurement of the threshold voltage has two plane-parallel outer plates at a separation of 20 μm and electrode layers with over-lying alignment layers of SE-1211 (Nissan Chemicals) on the insides of the outer plates, which effect a homeotropic alignment of the liquid crystals.

EXAMPLES

The following examples are VA mixtures for passive matrix applications.

Example 1

| | | | |
|---|---|---|---|
| CY-3-02 | 10.00% | Clearing point: | +100.0 |
| CY-3-04 | 16.00% | $\epsilon_\parallel$ [1 kHz, 20° C.]: | 4.2 |
| CY-5-02 | 10.00% | $\epsilon_\perp$ [1 kHz, 20° C.]: | 10.6 |
| CPY-2-02 | 12.00% | Δn [589 nm, 20° C.]: | +0.1427 |
| CPY-3-02 | 12.00% | Δ∈ [1 kHz, 20° C.]: | −6.4 |
| CCY-3-02 | 6.00% | | |
| CCY-3-03 | 6.00% | | |
| CCY-4-02 | 6.00% | | |
| CCY-5-02 | 6.00% | | |
| PYP-2-3 | 7.00% | | |
| PYP-2-4 | 3.00% | | |
| CPTP-301 | 3.00% | | |
| CPTP-302 | 3.00% | | |

Example 2

| | | | |
|---|---|---|---|
| CY-3-02 | 10.00% | Clearing point: | +100.0 |
| CY-3-04 | 15.00% | $\epsilon_\parallel$ [1 kHz, 20° C.]: | 4.2 |
| CY-5-02 | 10.00% | $\epsilon_\perp$ [1 kHz, 20° C.]: | 10.2 |
| CPY-2-02 | 12.00% | Δn [589 nm, 20° C.]: | +0.1517 |
| CPY-3-02 | 12.00% | Δ∈ [1 kHz, 20° C.]: | −6.0 |
| CCY-3-02 | 5.00% | | |
| CCY-3-03 | 5.00% | | |
| CCY-4-02 | 5.00% | | |
| CCY-5-02 | 5.00% | | |
| PYP-2-3 | 12.00% | | |
| PYP-2-4 | 2.00% | | |
| CPTP-301 | 4.00% | | |
| CPTP-302 | 3.00% | | |

Example 3

| | | | |
|---|---|---|---|
| CY-3-02 | 4.00% | Clearing point: | +111.0 |
| CY-3-04 | 12.50% | $\epsilon_\parallel$ [1 kHz, 20° C.]: | 3.5 |
| CCY-3-02 | 5.50% | $\epsilon_\perp$ [1 kHz, 20° C.]: | 6.7 |
| CPY-2-02 | 12.00% | Δn [589 nm, 20° C.]: | +0.1525 |
| CPY-3-02 | 12.00% | Δ∈ [1 kHz, 20° C.]: | −3.2 |
| PYP-2-3 | 9.50% | | |
| PYP-2-4 | 9.50% | | |
| CPTP-301 | 5.00% | | |
| CPTP-302 | 2.50% | | |
| CC-4-V | 17.50% | | |
| BCH-32 | 5.00% | | |
| CCPC-33 | 5.00% | | |

Example 4

| | | | |
|---|---|---|---|
| CY-3-O2 | 6.00% | Clearing point: | +97.0 |
| CY-3-O4 | 15.00% | $\epsilon_\parallel$ [1 kHz, 20° C.]: | 3.8 |
| CPY-2-O2 | 6.00% | $\epsilon_\perp$ [1 kHz, 20° C.]: | 6.0 |
| PYP-2-3 | 12.00% | Δn [589 nm, 20° C.]: | +0.2282 |
| PYP-2-4 | 12.00% | Δ∈ [1 kHz, 20° C.]: | −2.2 |
| PTP-102 | 5.00% | | |
| PTP-201 | 5.00% | | |
| PTP-301 | 6.00% | | |
| PTP-302 | 6.00% | | |
| CPTP-301 | 5.00% | | |
| CPTP-302 | 5.00% | | |
| CPTP-303 | 5.00% | | |
| BCH-32 | 5.00% | | |
| PGIGI-3-F | 7.00% | | |

Example 5

| | | | |
|---|---|---|---|
| CY-3-O2 | 5.00% | Clearing point: | +101.0 |
| CY-3-O4 | 11.00% | $\epsilon_\parallel$ [1 kHz, 20° C.]: | 3.7 |
| CPY-2-O2 | 9.00% | $\epsilon_\perp$ [1 kHz, 20° C.]: | 5.7 |
| PYP-2-3 | 12.00% | Δn [589 nm, 20° C.]: | +0.2349 |
| PYP-2-4 | 12.00% | Δ∈ [1 kHz, 20° C.]: | −2.0 |
| PTP-102 | 5.00% | | |
| PTP-201 | 5.00% | | |
| PTP-301 | 6.00% | | |
| PTP-302 | 6.00% | | |
| CPTP-301 | 5.00% | | |

-continued

| | |
|---|---|
| CPTP-302 | 5.00% |
| CPTP-303 | 5.00% |
| BCH-32 | 5.00% |
| PP-1-2V1 | 3.00% |
| PGIGI-3-F | 6.00% |

Example 6

| | | | |
|---|---|---|---|
| CY-3-O2 | 10.00% | Clearing point: | +106.0 |
| CY-3-O4 | 12.00% | $\epsilon_\parallel$ [1 kHz, 20° C.]: | 3.9 |
| CCY-3-O2 | 4.00% | $\epsilon_\perp$ [1 kHz, 20° C.]: | 8.1 |
| CCY-3-O3 | 4.00% | $\Delta n$ [589 nm, 20° C.]: | +0.2006 |
| CPY-2-O2 | 12.00% | $\Delta\epsilon$ [1 kHz, 20° C.]: | −4.2 |
| CPY-3-O2 | 12.00% | | |
| PYP-2-3 | 13.00% | | |
| PYP-2-4 | 13.00% | | |
| PTP-102 | 5.00% | | |
| PTP-201 | 5.00% | | |
| CPTP-301 | 5.00% | | |
| CPTP-302 | 5.00% | | |

Example 7

| | | | |
|---|---|---|---|
| CY-3-O2 | 13.00% | Clearing point: | +80.0 |
| CY-3-O4 | 18.00% | $\epsilon_\parallel$ [1 kHz, 20° C.]: | 4.1 |
| CPY-2-O2 | 6.00% | $\epsilon_\perp$ [1 kHz, 20° C.]: | 6.5 |
| PYP-2-3 | 12.00% | $\Delta n$ [589 nm, 20° C.]: | +0.2292 |
| PYP-2-4 | 12.00% | $\Delta\epsilon$ [1 kHz, 20° C.]: | −2.4 |
| PTP-102 | 5.00% | | |
| PTP-201 | 5.00% | | |
| PPTUI-3-2 | 15.00% | | |
| PPTUI-3-4 | 14.00% | | |

Example 8

| | | | |
|---|---|---|---|
| CY-3-O2 | 8.00% | Clearing point: | +91.0 |
| CY-3-O4 | 16.00% | $\epsilon_\parallel$ [1 kHz, 20° C.]: | 4.0 |
| CPY-2-O2 | 11.00% | $\epsilon_\perp$ [1 kHz, 20° C.]: | 6.3 |
| PYP-2-3 | 12.00% | $\Delta n$ [589 nm, 20° C.]: | +0.2434 |
| PYP-2-4 | 12.00% | $\Delta\epsilon$ [1 kHz, 20° C.]: | −2.3 |
| PTP-102 | 5.00% | | |
| PTP-201 | 5.00% | | |
| PPTUI-3-2 | 16.00% | | |
| PPTUI-3-4 | 15.00% | | |

Example 9

| | | | |
|---|---|---|---|
| CY-3-O4 | 10.00% | Clearing point: | +100.0 |
| PYP-2-3 | 10.00% | $\epsilon_\parallel$ [1 kHz, 20° C.]: | 3.8 |
| PYP-2-4 | 10.00% | $\epsilon_\perp$ [1 kHz, 20° C.]: | 6.8 |
| CC-5-V | 9.50% | $\Delta n$ [589 nm, 20° C.]: | +0.2405 |
| PTP-102 | 5.00% | $\Delta\epsilon$ [1 kHz, 20° C.]: | −2.9 |
| PTP-201 | 4.00% | | |
| PTP-301 | 4.00% | | |
| CPTP-301 | 4.50% | | |

-continued

| | |
|---|---|
| CPTP-302 | 4.50% |
| CPTP-303 | 4.50% |
| PTP-302FF | 12.00% |
| PTP-502FF | 12.00% |
| CPTP-302FF | 5.00% |
| CPTP-502FF | 5.00% |

Example 10

| | | | |
|---|---|---|---|
| CY-3-O2 | 6.00% | Clearing point: | +100.0 |
| CY-3-O4 | 8.00% | $\epsilon_\parallel$ [1 kHz, 20° C.]: | 4.1 |
| CPY-2-O2 | 5.00% | $\epsilon_\perp$ [1 kHz, 20° C.]: | 8.2 |
| CPY-3-O2 | 5.00% | $\Delta n$ [589 nm, 20° C.]: | +0.2468 |
| PYP-2-3 | 10.00% | $\Delta\epsilon$ [1 kHz, 20° C.]: | −4.2 |
| PYP-2-4 | 10.00% | | |
| PTP-102 | 5.00% | | |
| PTP-201 | 5.00% | | |
| PTP-301 | 3.50% | | |
| CPTP-301 | 5.00% | | |
| CPTP-302 | 3.50% | | |
| PTP-302FF | 12.00% | | |
| PTP-502FF | 12.00% | | |
| CPTP-302FF | 5.00% | | |
| CPTP-502FF | 5.00% | | |

Example 11

| | | | |
|---|---|---|---|
| CY-3-O2 | 6.00% | Clearing point: | +105.0 |
| CY-3-O4 | 11.50% | $\epsilon_\parallel$ [1 kHz, 20° C.]: | 4.2 |
| CCY-3-O2 | 5.50% | $\epsilon_\perp$ [1 kHz, 20° C.]: | 8.9 |
| CPY-2-O2 | 12.00% | $\Delta n$ [589 nm, 20° C.]: | +0.1804 |
| CPY-3-O2 | 12.00% | $\Delta\epsilon$ [1 kHz, 20° C.]: | −4.7 |
| PYP-2-3 | 12.00% | LTS in cells at −20° C.: | >1000 h |
| PYP-2-4 | 12.00% | LTS in cells at −30° C.: | >1000 h |
| CK-3-F | 5.00% | LTS in cells at −40° C.: | >1000 h |
| CK-5-F | 5.00% | | |
| CC-5-V | 4.50% | | |
| CPTP-301 | 5.00% | | |
| CPTP-302 | 5.00% | | |
| PTP-102 | 4.50% | | |

The entire disclosures of all applications, patents and publications, cited herein and of corresponding European application No. 06026256.5, filed Dec. 19, 2006 are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A liquid-crystalline medium based on a mixture of polar compounds having negative dielectric anisotropy, which contains at least one compound of formula I

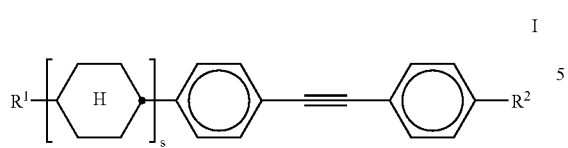

and at least one compound of formula I*,

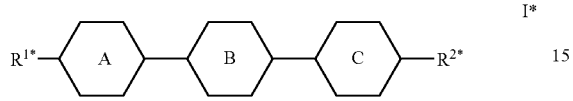

wherein
R¹, R², R¹* and R²* are, each independently, alkyl or alkoxy with 1 to 8 C atoms, in which one or more $CH_2$-groups are optionally replaced by —CH=CH—,

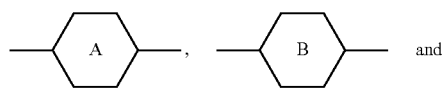

are, each independently,

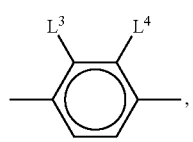

but at least one of the rings A, B and C is $L^1$, $L^2$, $L^3$ and $L^4$ are, each independently, Cl, F or $CF_3$, and s is 0 or 1.

2. A liquid-crystalline medium according to claim 1, further containing one or more compounds of formula II,

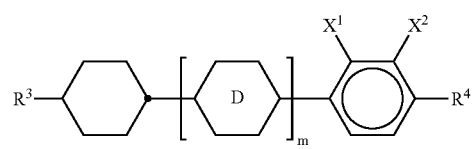

wherein
$R^3$ and $R^4$ are, each independently, alkyl or alkoxy with 1 to 8 C atoms, in which one or more $CH_2$-groups are optionally replaced by —CH=CH—,

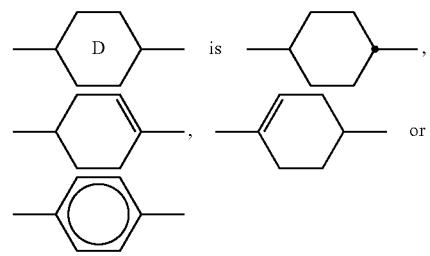

m is 0 or 1, and
$X^1$ and $X^2$ are, each independently, F, Cl, $OCF_3$, $OCHF_2$, or $CF_3$.

3. A medium according to claim 1, further containing three or more compounds of formula III,

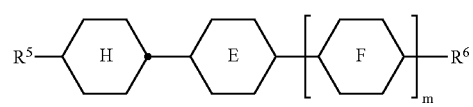

in which

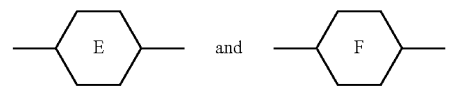

are, each independently,

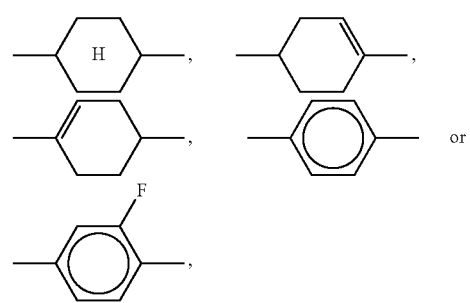

$R^5$ and $R^6$ are, each independently, alkyl or alkoxy with 1 to 8 C atoms, in which one or more $CH_2$-groups are optionally replaced by —CH=CH— or —O—, and
m is 0, 1 or 2.

4. A medium according to claim 1, further containing at least one compound of formula IVa, IVb, IVc, IVd, IVe, IVf, IVg, IVh, IVi, or IVj

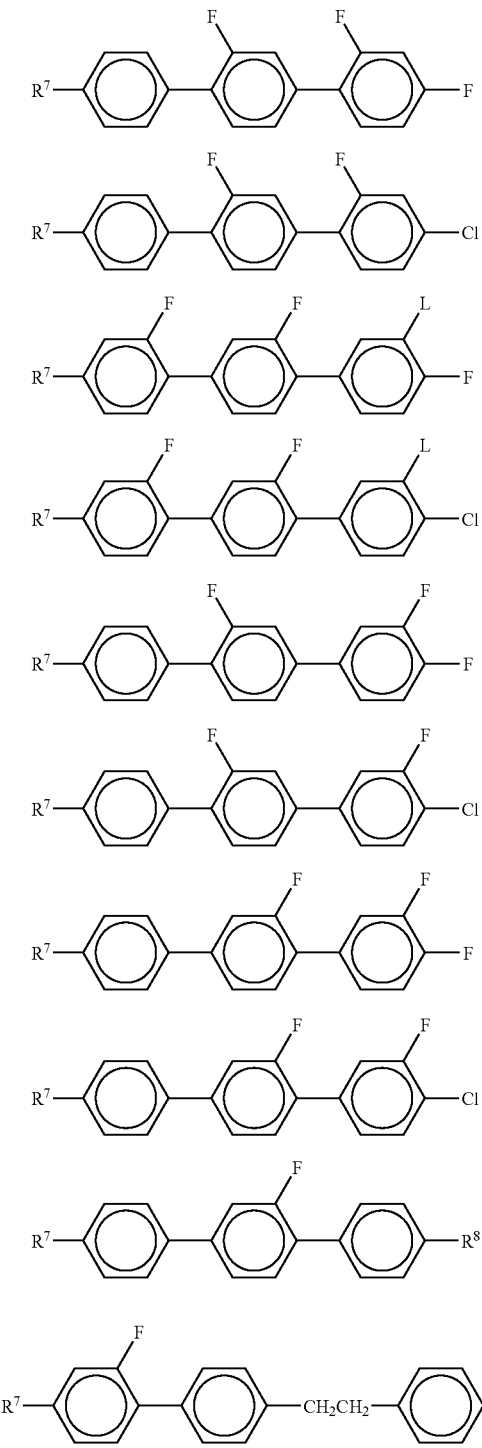

in which
R⁷ and R⁸ are, each independently, alkyl or alkoxy with 1 to 8 C atoms, in which one or more CH₂-groups are optionally replaced by —CH=CH—, and
L is H, F or Cl.

5. A medium according to claim 2, which comprises four or more compounds of formulae I*, I and II and at least one compound of formula III

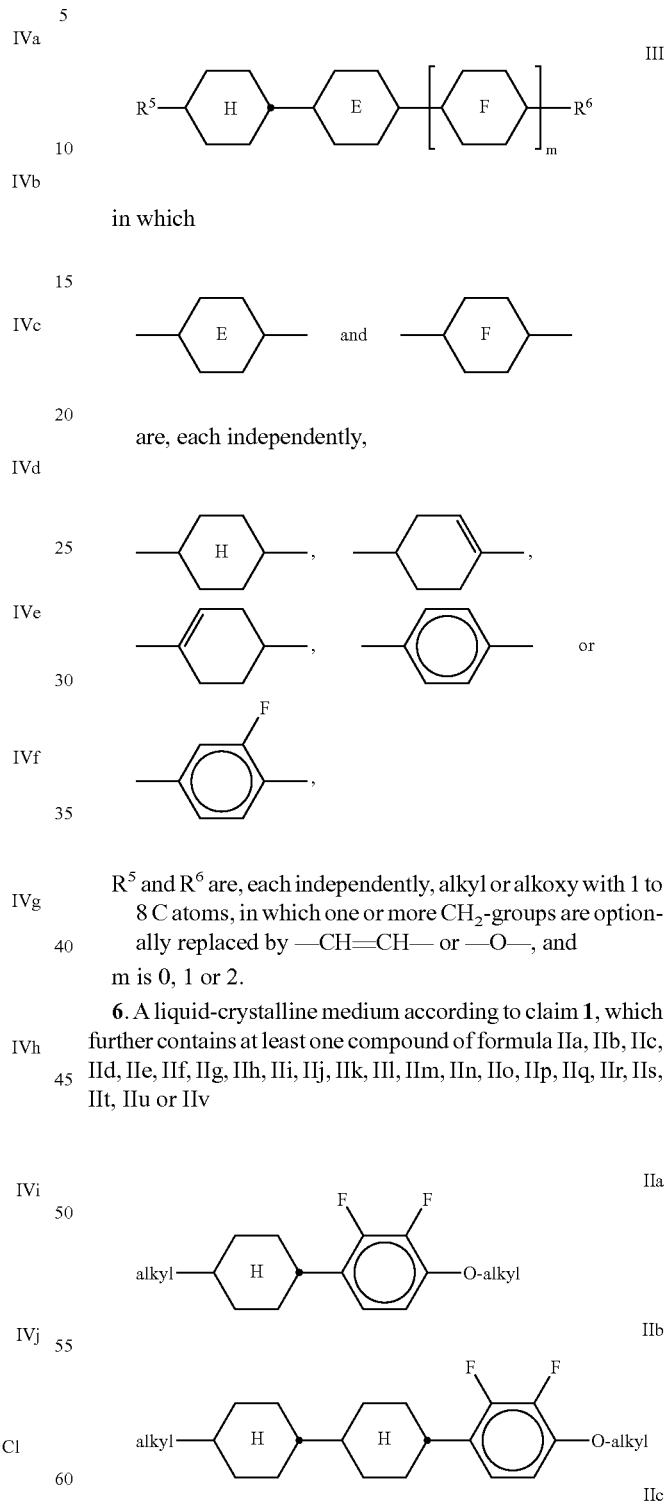

in which

E and F are, each independently,

H, (cyclohexene), (cyclohexene), (phenyl) or (fluorophenyl),

R⁵ and R⁶ are, each independently, alkyl or alkoxy with 1 to 8 C atoms, in which one or more CH₂-groups are optionally replaced by —CH=CH— or —O—, and
m is 0, 1 or 2.

6. A liquid-crystalline medium according to claim 1, which further contains at least one compound of formula IIa, IIb, IIc, IId, IIe, IIf, IIg, IIh, IIi, IIj, IIk, Il, IIm, IIn, IIo, IIp, IIq, IIr, IIs, IIt, IIu or IIv -continued

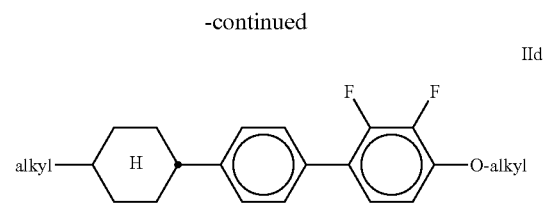
IId

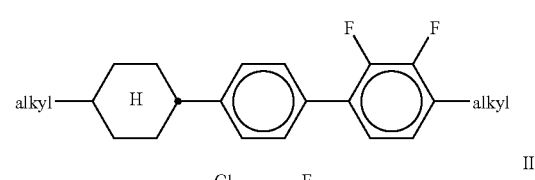
IIe

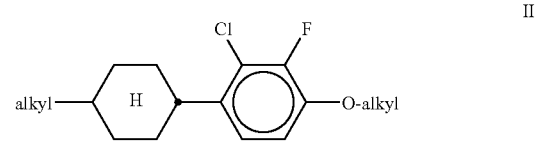
IIf

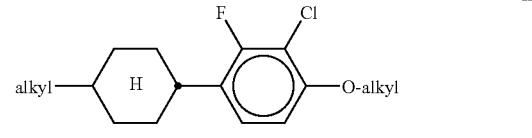
IIg

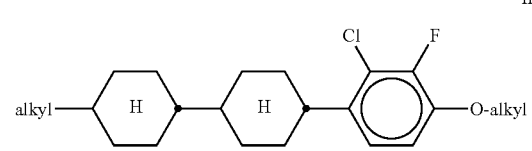
IIh

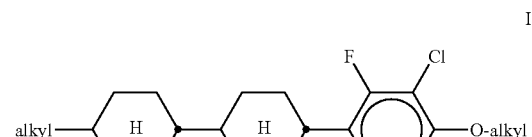
IIi

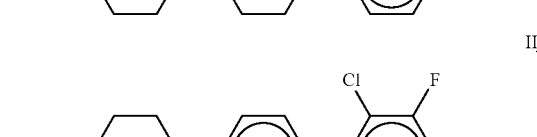
IIj

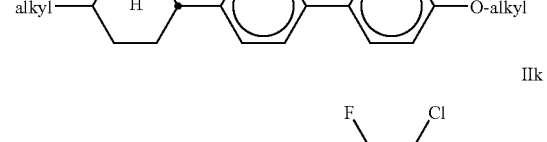
IIk

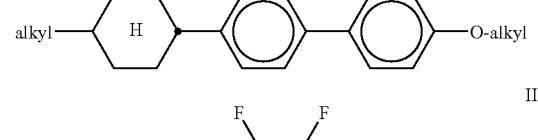
IIl

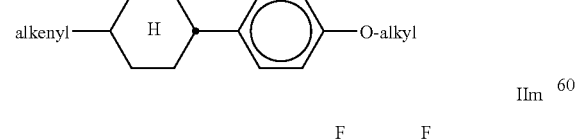
IIm

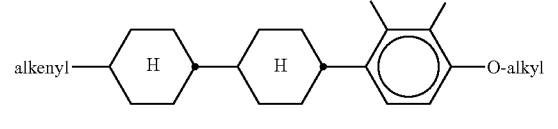

-continued

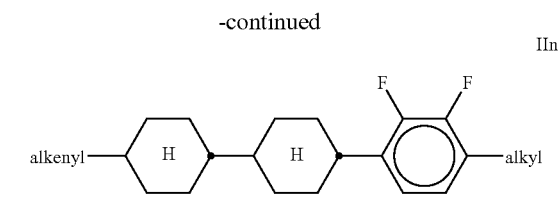
IIn

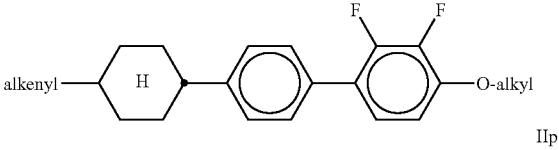
IIo

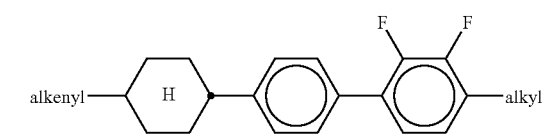
IIp

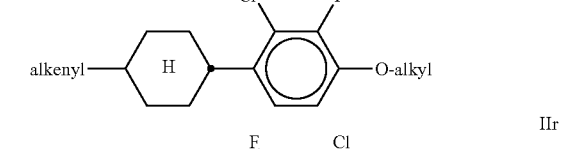
IIq

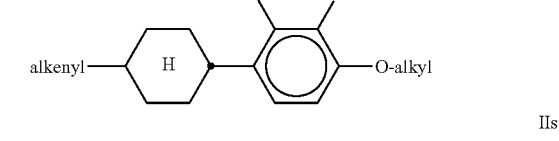
IIr

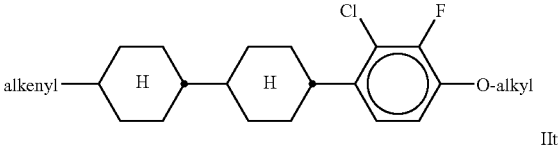
IIs

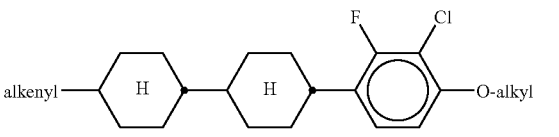
IIt

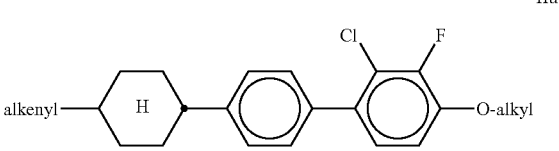
IIu

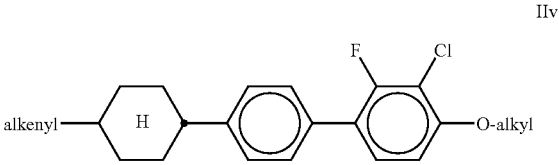
IIv

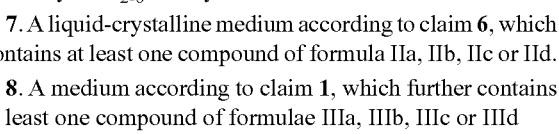

in which alkyl are, each independently, $C_{1-6}$-alkyl, and alkenyl is $C_{2-6}$-alkenyl.

7. A liquid-crystalline medium according to claim 6, which contains at least one compound of formula IIa, IIb, IIc or IId.

8. A medium according to claim 1, which further contains at least one compound of formulae IIIa, IIIb, IIIc or IIId

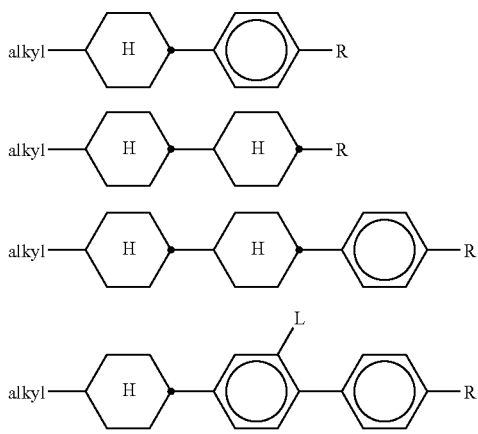

wherein alkyl is $C_{1-6}$-alkyl, R is $C_{1-6}$-alkyl, -alkoxy or $C_{2-6}$-alkenyl and L is H or F.

9. A liquid-crystalline medium according to claim 2, which contains
- 2-45% by weight of one or more compounds of the formula I,
- 5-30% by weight of one or more compounds of the formula I*,
- 20-85% by weight of one or more compounds of the formula II,
- 0-20% by weight of one or more compounds of the formula III,

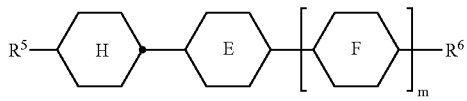

in which

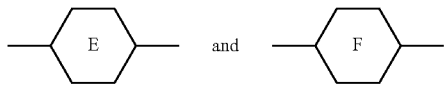

are, each independently,

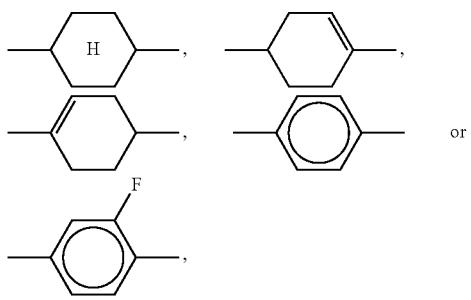

$R^5$ and $R^6$ are, each independently, alkyl or alkoxy with 1 to 8 C atoms, in which one or more $CH_2$-groups are optionally replaced by —CH=CH— or —O—, and m is 0, 1 or 2, wherein the total amount of the compounds of formulae I, I*, II and III in the mixture is ≦100%.

10. A process for preparing a liquid-crystalline medium according to claim 1, comprising mixing compounds of formulae I and I* with further mesogen compounds.

11. An electro-optical display having active or passive matrix addressing based on the ECB effect, which contains, as dielectric, a liquid-crystalline medium according to claim 1.

12. A display according to claim 11, which is a projection display.

13. A liquid-crystalline medium according to claim 1, wherein $L^1$, $L^2$, $L^3$ and $L^4$ are F.

14. A liquid-crystalline medium according to claim 1, which contains a compound of formula Ia, Ib, Ic, Id, Ie, If, Ig, or Ih

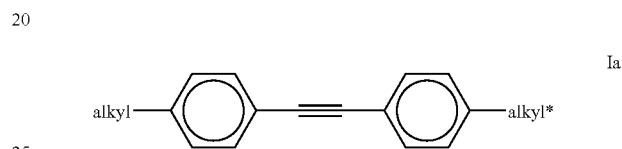

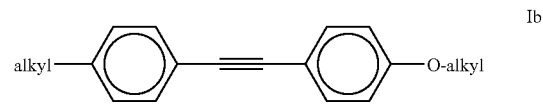

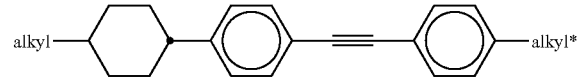

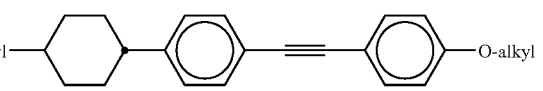

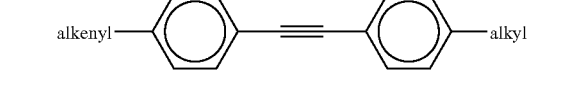

wherein
- alkyl, alkyl* and =O-alkyl are, in each case independently, a straight chained residue containing 1 to 6 carbon atoms, and
- alkenyl is a straight chain or branched alkenyl group with 2 to 7 C atoms.

15. A liquid-crystalline medium according to claim 1, which contains a compound of formula I*a, I*b, I*c, I*d, I*e, I*f, I*g, I*h, I*I, I*j, I*k or I*l
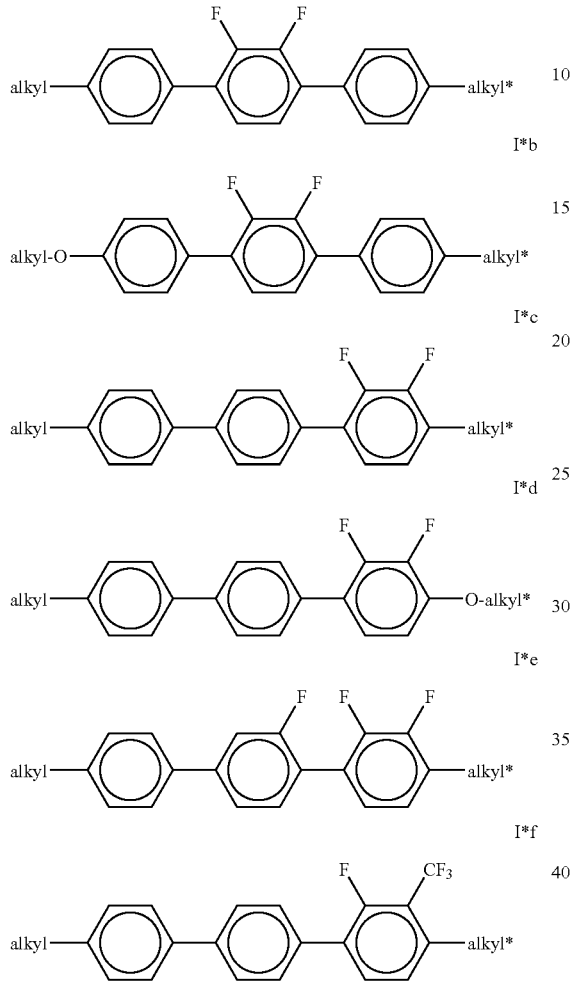
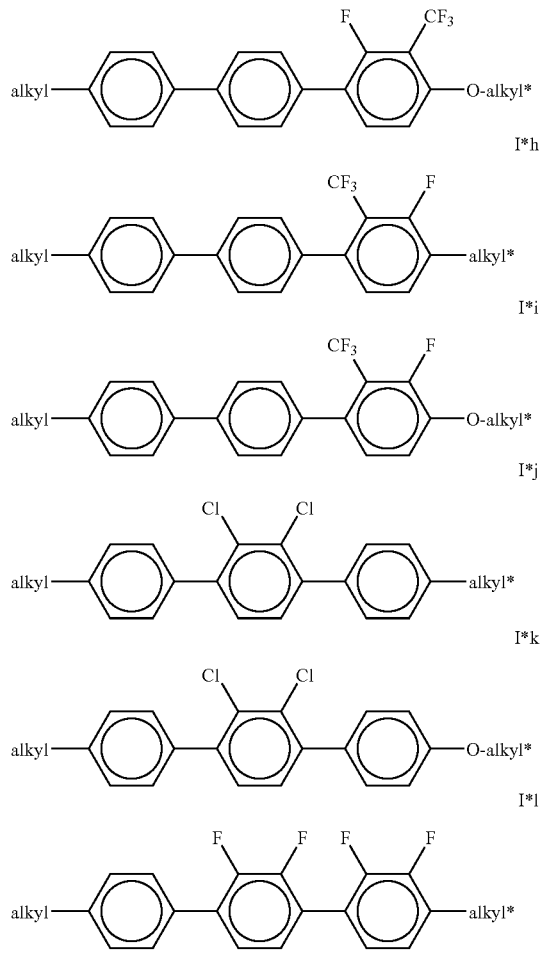
wherein alkyl, alkyl* and =O-alkyl are, in each case independently, a straight chained residue containing 1 to 6 carbon atoms.
* * * * *

UNITED STATES PATENT AND TRADEMARK OFFICE
CERTIFICATE OF CORRECTION

PATENT NO. : 7,803,434 B2
APPLICATION NO. : 11/960023
DATED : September 28, 2010
INVENTOR(S) : Akihiro Kojima Page 1 of 1

It is certified that error appears in the above-identified patent and that said Letters Patent is hereby corrected as shown below:

Column 49, line 42 reads: " 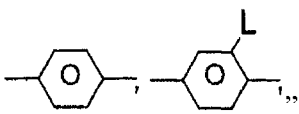 "

Should read; --  --

Signed and Sealed this
Twenty-eighth Day of December, 2010

David J. Kappos
*Director of the United States Patent and Trademark Office*